United States Patent
Chen et al.

(10) Patent No.: US 10,134,353 B2
(45) Date of Patent: Nov. 20, 2018

(54) GATE DRIVING CIRCUIT, DISPLAY PANEL AND DISPLAY APPARATUS HAVING THE SAME, AND DRIVING METHOD THEREOF

(71) Applicants: BOE TECHNOLOGY GROUP CO., LTD., Beijing (CN); CHONGQING BOE OPTOELECTRONICS TECHNOLOGY CO., LTD., Chongqing (CN)

(72) Inventors: Shuai Chen, Beijing (CN); Xu Lu, Beijing (CN); Lijun Xiao, Beijing (CN); Zhi Zhang, Beijing (CN); Daoping Yu, Beijing (CN); Keke Gu, Beijing (CN); Siqing Fu, Beijing (CN); Zhijian Qi, Beijing (CN); Wenlong Feng, Beijing (CN); Guanyu Zhou, Beijing (CN); Mengjie Wang, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

(*) Notice: Subject to any disclaimer, the term of this patent is extended or adjusted under 35 U.S.C. 154(b) by 0 days.

(21) Appl. No.: 15/504,111

(22) PCT Filed: Aug. 16, 2016

(86) PCT No.: PCT/CN2016/095528
§ 371 (c)(1),
(2) Date: Feb. 15, 2017

(87) PCT Pub. No.: WO2017/133218
PCT Pub. Date: Aug. 10, 2017

(65) Prior Publication Data
US 2018/0108320 A1  Apr. 19, 2018

(30) Foreign Application Priority Data

Feb. 4, 2016 (CN) .......................... 2016 1 0079905

(51) Int. Cl.
*G09G 3/36* (2006.01)
*G09G 3/3266* (2016.01)
(Continued)

(52) U.S. Cl.
CPC ......... *G09G 3/3688* (2013.01); *G02F 1/1368* (2013.01); *G02F 1/13306* (2013.01);
(Continued)

(58) Field of Classification Search
CPC ............... G09G 3/3688; G09G 3/3677; G02F 1/13306; G02F 1/136286; G02F 1/1368
See application file for complete search history.

(56) References Cited

U.S. PATENT DOCUMENTS

2005/0201508 A1* 9/2005 Shin ..................... G09G 3/3677
377/10
2006/0187175 A1* 8/2006 Lo ....................... G09G 3/3677
345/100
(Continued)

FOREIGN PATENT DOCUMENTS

CN 202838908 U 3/2013
CN 103871342 A 6/2014
(Continued)

OTHER PUBLICATIONS

The First Office Action in the Chinese Patent Application No. 201610079905.1, dated Jun. 7, 2017; English translation attached.
(Continued)

*Primary Examiner* — Ibrahim A Khan
(74) *Attorney, Agent, or Firm* — Intellectual Valley Law, P.C.

(57) ABSTRACT

The present application discloses a display panel having a plurality of gate lines and a gate driving circuit for driving (Continued)

the plurality of gate lines, the gate driving circuit including a plurality of first cascaded shift register units and a plurality of second cascaded shift register units for applying gate scanning signals to gate lines connected thereto. The display panel includes a first pair of first cascaded shift register unit and second cascaded shift register unit; a second pair of first cascaded shift register unit and second cascaded shift register unit; the second pair adjacent to the first pair; the first cascaded shift register unit in the first pair is electrically coupled to the second cascaded shift register unit in the second pair; and the second cascaded shift register unit in the first pair is electrically coupled to the first cascaded shift register unit in the second pair; a first group of gate lines connecting the first pair of first cascaded shift register unit and second cascaded shift register unit; and a second group of gate lines connecting the first cascaded shift register unit in the first pair and the first cascaded shift register unit in the second pair. The gate driving circuit includes a first column of cascaded shift register units and a second column of cascaded shift register units, the first column and the second column having a same number of cascaded shift register units; the first cascaded shift register unit in the first pair is an odd numbered cascaded shift register unit in the first column, the second cascaded shift register unit in the first pair is an odd numbered cascaded shift register unit in the second column, the first cascaded shift register unit in the second pair is an even numbered cascaded shift register unit in the second column, and the second cascaded shift register unit in the second pair is an even numbered cascaded shift register unit in the first column.

19 Claims, 8 Drawing Sheets

(51) Int. Cl.
  *G02F 1/133* (2006.01)
  *G02F 1/1362* (2006.01)
  *G02F 1/1368* (2006.01)

(52) U.S. Cl.
  CPC ..... *G02F 1/136286* (2013.01); *G09G 3/3266* (2013.01); *G09G 3/3677* (2013.01); *G09G 2310/0221* (2013.01); *G09G 2310/0267* (2013.01); *G09G 2310/0286* (2013.01); *G09G 2310/08* (2013.01); *G09G 2320/0223* (2013.01)

(56) References Cited

U.S. PATENT DOCUMENTS

| | | | | |
|---|---|---|---|---|
| 2006/0274021 | A1* | 12/2006 | Park | G09G 3/20 345/100 |
| 2007/0001991 | A1* | 1/2007 | Jang | G09G 3/3677 345/100 |
| 2007/0164954 | A1* | 7/2007 | Yang | G09G 3/3677 345/88 |
| 2007/0164972 | A1* | 7/2007 | Chang | G09G 3/3677 345/100 |
| 2008/0012842 | A1* | 1/2008 | Mori | G09G 3/3677 345/206 |
| 2008/0136756 | A1* | 6/2008 | Yeo | G09G 3/3677 345/87 |
| 2008/0266477 | A1* | 10/2008 | Lee | G09G 3/3677 349/46 |
| 2009/0179847 | A1 | 7/2009 | Harada et al. | |
| 2012/0062528 | A1* | 3/2012 | Kimura | G09G 3/3677 345/204 |
| 2014/0078124 | A1* | 3/2014 | Chen | G09G 3/3266 345/205 |
| 2014/0354523 | A1* | 12/2014 | So | G09G 3/3677 345/100 |

FOREIGN PATENT DOCUMENTS

| | | |
|---|---|---|
| CN | 103985362 A | 8/2014 |
| CN | 104914641 A | 9/2015 |
| CN | 105161046 A | 12/2015 |

OTHER PUBLICATIONS

International Search Report & Written Opinion dated Oct. 28, 2016 regarding PCT/CN2016/095528.

* cited by examiner

GATE DRIVING CIRCUIT, DISPLAY PANEL AND DISPLAY APPARATUS HAVING THE SAME, AND DRIVING METHOD THEREOF

CROSS-REFERENCE TO RELATED APPLICATION

This application is a national stage application under 35 U.S.C. § 371 of International Application No. PCT/CN2016/095528, filed Aug. 16, 2016, which claims priority to Chinese Patent Application No. 201610079905.1, filed Feb. 4, 2016, the contents of which are incorporated by reference in the entirety.

TECHNICAL FIELD

The present invention relates to display technology, more particularly, to a gate driving circuit, a display panel and a display apparatus having the same, and a driving method thereof.

BACKGROUND

FIG. 1 is a diagram illustrating the structure of a gate driving circuit in a conventional display panel. Referring to FIG. 1, the conventional gate driving circuit includes a plurality pairs of gate driving integrated circuits, each of which includes an integrated circuit on the left side of the display area ("AA" area) and a corresponding integrated circuit on the right side of the display area. Each pair of gate driving integrated circuits is connected by a plurality of gate lines. In each pair, the number of gate lines connected to the integrated circuit on the left side of the display area is the same as the number of gate lines connected to the integrated circuit on the right side of the display area. In each pair, the integrated circuit on the left side and the integrated circuit on the right side drive the same number of gate lines, and complete application of gate scanning signals to the gate lines simultaneously. Upon completion of application of gate scanning signals in a pair of integrated circuits, the conventional gate driving scheme then switches to an adjacent pair of integrated circuits for applying gate scanning signals to the gate lines connecting the adjacent pair of integrated circuits. Because the pair of integrated circuits complete application of gate scanning signals to the gate lines simultaneously, switching of gate integrated circuit units occurs on the left side and the right side at the same time. Simultaneous switching of integrated circuits on both sides affects gate on voltage $V_{on}$ and gate off voltage $V_{g1}$, resulting in technical problems such as split screen and H-block.

SUMMARY

In one aspect, the present invention provides a display panel having a plurality of gate lines and a gate driving circuit for driving the plurality of gate lines, the gate driving circuit including a plurality of first cascaded shift register units and a plurality of second cascaded shift register units for applying gate scanning signals to gate lines connected thereto; the display panel comprising a first pair of first cascaded shift register unit and second cascaded shift register unit; a second pair of first cascaded shift register unit and second cascaded shift register unit; the second pair adjacent to the first pair; the first cascaded shift register unit in the first pair is electrically coupled to the second cascaded shift register unit in the second pair; and the second cascaded shift register unit in the first pair is electrically coupled to the first cascaded shift register unit in the second pair; a first group of gate lines connecting the first pair of first cascaded shift register unit and second cascaded shift register unit; and a second group of gate lines connecting the first cascaded shift register unit in the first pair and the first cascaded shift register unit in the second pair; wherein the gate driving circuit comprises a first column of cascaded shift register units and a second column of cascaded shift register units, the first column and the second column having a same number of cascaded shift register units; the first cascaded shift register unit in the first pair is an odd numbered cascaded shift register unit in the first column, the second cascaded shift register unit in the first pair is an odd numbered cascaded shift register unit in the second column, the first cascaded shift register unit in the second pair is an even numbered cascaded shift register unit in the second column, and the second cascaded shift register unit in the second pair is an even numbered cascaded shift register unit in the first column.

Optionally, the display panel further comprises a third group of gate lines connecting the second pair of first cascaded shift register unit and second cascaded shift register unit.

Optionally, the first group and the third group have a same number of gate lines.

Optionally, the display panel further comprising a delay controller connected to the first cascaded shift register unit and the second cascaded shift register unit in the first pair, respectively; the first cascaded shift register unit in the first pair is configured to provide a first signal to the delay controller when the first cascaded shift register unit in the first pair completes application of gate scanning signal to gate lines connected thereto; the second cascaded shift register unit in the first pair is configured to provide a second signal to the first cascaded shift register unit in the second pair and the delay controller when the second cascaded shift register unit in the first pair completes application of gate scanning signal to gate lines connected thereto; and upon receiving the first signal from the first cascaded shift register unit in the first pair and the second signal from the second cascaded shift register unit in the first pair, the delay controller is configured to synchronize application of gate scanning signals by the second pair of first cascaded shift register unit and second cascaded shift register unit to the third group of gate lines.

Optionally, the delay controller further comprises an AND gate, a timing controller for generating a delay clock signal, and a timing counter for generating a delay control signal based on the delay clock signal and the second signal; the first input terminal of the AND gate is configured to receive the first signal, the second input terminal of the AND gate is configured to receive the delay control signal, and the output terminal of the AND gate is connected to the second cascaded shift register unit in the second pair; and when the first signal and the delay control signal are both valid, the AND gate outputs a control signal to turn on the second cascaded shift register unit in the second pair for applying gate scanning signal to gate lines connected thereto.

Optionally, the timing counter comprises a timer and an input-output selector; the timing controller is configured to generate an input-output selection signal; the timer comprises an input node and an output node; upon receiving the delay clock signal, the timer determines a delay period based on the delay clock signal, delays the second signal input from the input node by the delay period, and outputs the delay control signal to the output node; and upon receiving the input-output selection signal, the input-output selector controls an electrical connection between the input node and the second cascaded shift register unit in the first pair for inputting the second signal, and controls an electrical connection between the output node and the second input terminal of the AND gate for outputting the delay control signal.

Optionally, the gate driving circuit further comprises a protection diode having an anode connected to the second cascaded shift register unit in the first pair for receiving the second signal and a cathode connected to the input node of the timer.

Optionally, the first cascaded shift register unit of the first pair and the second cascaded shift register unit of the second pair are on a first side of the display panel; and the second cascaded shift register unit of the first pair and the first cascaded shift register unit of the second pair are on a second side of the display panel.

Optionally, the display panel comprises a plurality of first pairs and a plurality of second pairs alternately arranged on the display panel; the first side having a plurality of first cascaded shift register units and a plurality of second cascaded shift register units alternately arranged; and the second side having a plurality of second cascaded shift register units and a plurality of first cascaded shift register units alternatedly arranged; and the first cascaded shift register unit in the first pair is configured to receive a first start vertical signal from the timing controller; and the second cascaded shift register unit in the first pair is configured to receive a second start vertical signal from the timing controller.

Optionally, the first cascaded shift register unit receiving the first start vertical signal is a first cascaded shift register unit on the first side, and the second cascaded shift register unit receiving the second start vertical signal is a first cascaded shift register unit on the second side.

Optionally, the first cascaded shift register unit of the first pair and the second cascaded shift register unit of the second pair are on a first side of the display panel; and the second cascaded shift register unit of the first pair and the first cascaded shift register unit of the second pair are on a second side of the display panel; when the input-output selection signal is a first voltage signal, the input node of the timer is connected to the second cascaded shift register unit of the first pair on the second side, and the output node of the timer is connected to the second cascaded shift register unit of the second pair on the first side; and when the input-output selection signal is a second voltage signal, the input node of the timer is connected to the second cascaded shift register unit of the second pair on the first side, and the output node of the timer is connected to the second cascaded shift register unit of the first pair on the second side.

Optionally, the first cascaded shift register unit of the first pair and the second cascaded shift register unit of the second pair are on a first side of the display panel; and the second cascaded shift register unit of the first pair and the first cascaded shift register unit of the second pair are on a second side of the display panel; the delay clock signal determines a number of delay steps in the delay period provided by the timer; the second cascaded shift register unit in the first pair completes application of gate scanning signal to gate lines connected thereto earlier than the first cascaded shift register unit in the first pair completes application of gate scanning signal to gate lines connected thereto by N clock pulse vertical signals; and the number of delay steps is determined to be N.

Optionally, the display panel comprises a plurality of first pairs and a plurality of second pairs alternately arranged on the display panel; the first cascaded shift register unit in each of the plurality of first pairs is electrically coupled to the second cascaded shift register unit in each adjacent second pair; and the second cascaded shift register unit in each of the plurality of first pairs is electrically coupled to the first cascaded shift register unit in each adjacent second pair; a first group of gate lines connecting each of the plurality of first pairs and connecting each of the plurality of second pairs, respectively; and a second group of gate lines connecting the first cascaded shift register unit in each of the plurality of first pairs and the first cascaded shift register unit in each adjacent second pair.

In another aspect, the present invention provides a method for driving an operation of a gate driving circuit in a display panel described herein, comprising providing gate scanning signals by the first cascaded shift register unit in the first pair to gate lines connected thereto; and providing gate scanning signals by the second cascaded shift register unit in the first pair to gate lines connected thereto; wherein the second cascaded shift register unit in the first pair completes application of gate scanning signal to gate lines connected thereto earlier than the first cascaded shift register unit in the first pair completes application of gate scanning signal to gate lines connected thereto by N clock pulse vertical signals.

Optionally, the method further comprises providing the first signal by the first cascaded shift register unit in the first pair to the delay controller when the first cascaded shift register unit in the first pair completes application of gate scanning signal to gate lines connected thereto; providing the second signal by the second cascaded shift register unit in the first pair to the first cascaded shift register unit in the second pair and the delay controller when the second cascaded shift register unit in the first pair completes application of gate scanning signal to gate lines connected thereto; and synchronizing application of gate scanning signals from the second pair of first cascaded shift register unit and second cascaded shift register unit to the third group of gate lines by the delay controller, upon receiving the first signal from the first cascaded shift register unit in the first pair and the second signal from the second cascaded shift register unit in the first pair by the delay controller.

Optionally, the step of synchronizing comprises generating the delay clock signal by the timing controller; generating the delay control signal based on the delay clock signal and the second signal by the timing counter; and outputting the control signal by the AND gate to turn on the second cascaded shift register unit in the second pair for applying gate scanning signal to gate lines connected thereto when the first signal and the delay control signal are both valid.

Optionally, the method further comprises generating an input-output selection signal by the timing controller; wherein the step of generating the delay clock signal comprises controlling the electrical connection between the input node and the second cascaded shift register unit in the first pair by the input-output selector based on the input-output selection signal; controlling the electrical connection between the output node and the second input terminal of the AND gate by the input-output selector based on the input-output selection signal; determining a delay period by the timer based on the delay clock signal; delaying the second signal input from the input node of the timer by the delay period; and outputting the delay control signal to the output node.

In another aspect, the present invention provides a gate driving circuit comprising a plurality pairs of cascaded shift register units for driving a plurality of gate lines; and two cascaded shift register units in each pair of cascaded shift register units have different stages of cascaded shift registers.

Optionally, each pair of cascaded shift register units comprises a first cascaded shift register unit and a second cascaded shift register unit; the first cascaded shift register unit and the second cascaded shift register unit having different stages of cascaded shift registers; the first cascaded shift register unit in each pair is adjacent to and electrically coupled to the second cascaded shift register unit in each adjacent pair; and the second cascaded shift register unit in each pair is adjacent to and electrically coupled to the first cascaded shift register unit in each adjacent pair.

In another aspect, the present invention provides a display apparatus comprising a display panel described herein.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
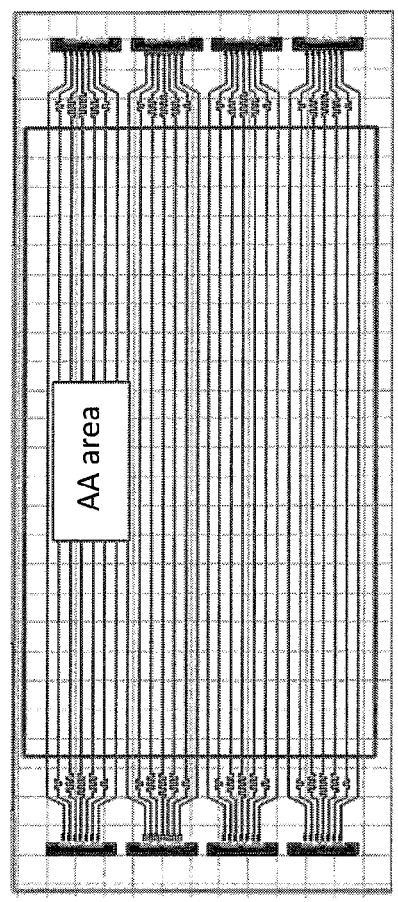
FIG. 1 is a diagram illustrating the structure of a gate driving circuit in a conventional display panel.

The disclosure will now describe more specifically with reference to the following embodiments. It is to be noted that the following descriptions of some embodiments are presented herein for purpose of illustration and description only. It is not intended to be exhaustive or to be limited to the precise form disclosed.

The present disclosure is directed to a display panel having a gate driving circuit, a display apparatus having the same, and a method of driving the gate driving circuit therein that substantially obviates one or more of the problems due to limitations and disadvantages of the related art.

In one aspect, the present disclosure provides a novel display panel having a plurality of gate lines and a gate driving circuit for driving the plurality of gate lines. In some embodiments, the gate driving circuit includes a plurality of first cascaded shift register units and a plurality of second cascaded shift register units for applying gate scanning signals to gate lines connected thereto. In some embodiments, the display panel includes a first pair of first cascaded shift register unit and second cascaded shift register unit, and a second pair of first cascaded shift register unit and second cascaded shift register unit, the second pair being adjacent to the first pair. Optionally, the first cascaded shift register unit in the first pair is electrically coupled to the second cascaded shift register unit in the second pair; and the second cascaded shift register unit in the first pair is electrically coupled to the first cascaded shift register unit in the second pair. The display panel further includes a first group of gate lines connecting the first pair of first cascaded shift register unit and second cascaded shift register unit; and a second group of gate lines connecting the first cascaded shift register unit in the first pair and the first cascaded shift register unit in the second pair. Specifically, the gate driving circuit includes a first column of cascaded shift register units and a second column of cascaded shift register units. The first column and the second column have a same number of cascaded shift register units. The first cascaded shift register unit in the first pair is an odd numbered cascaded shift register unit in the first column. The second cascaded shift register unit in the first pair is an odd numbered cascaded shift register unit in the second column. The first cascaded shift register unit in the second pair is an even numbered cascaded shift register unit in the second column. The second cascaded shift register unit in the second pair is an even numbered cascaded shift register unit in the first column.

Optionally, the first column of cascaded shift register units includes a plurality of first cascaded shift register units and second cascaded shift register unit, every odd numbered cascaded shift register unit is a first cascaded shift register unit, and every even numbered cascaded shift register unit is a second cascaded shift register unit. Optionally, the second column of cascaded shift register units includes a plurality of first cascaded shift register units and second cascaded shift register unit, every even numbered cascaded shift register unit is a first cascaded shift register unit, and every odd numbered cascaded shift register unit is a second cascaded shift register unit. Optionally, the display panel includes a plurality first pairs of an odd numbered first cascaded shift register unit in the first column and an odd numbered second cascaded shift register unit in the second column, and a plurality second pairs of an even numbered second cascaded shift register unit in the first column and an even number first cascaded shift register unit in the second column; the first pair and the second pair are alternately arranged.

In some embodiments, the display panel further includes a third group of gate lines connecting the second pair of first cascaded shift register unit and second cascaded shift register unit. Optionally, the third group is different from the first group, e.g., the third group has a different number of gate lines from the first group. Optionally, the third group is the same as the first group, e.g., the third group has a same number of gate lines as the first group.

Figure 2:
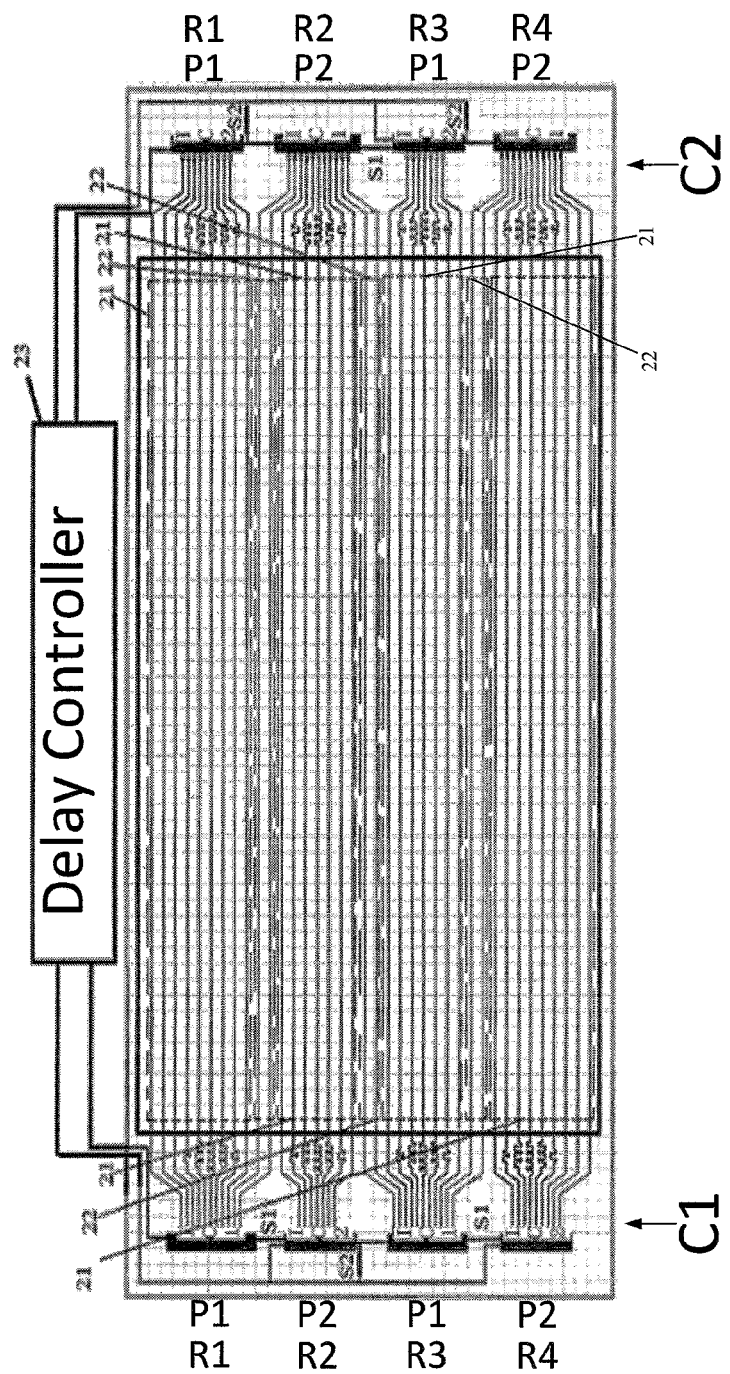
FIG. 2 is a diagram illustrating the structure of a gate driving circuit of a display panel in some embodiments.

FIG. 2 is a diagram illustrating the structure of a gate driving circuit of a display panel in some embodiments. Referring to FIG. 2, the display panel in the embodiment includes a plurality of gate lines (e.g., gate lines 21 and gate lines 22) and a gate driving circuit for driving the plurality of gate lines. The gate driving circuit in the embodiment includes a plurality of first cascaded shift register units IC1 and a plurality of second cascaded shift register units IC2 for applying gate scanning signals to gates lines connected thereto. Optionally, each cascaded shift register unit includes a number of stages of cascaded shift registers for connecting with a same number of gate lines.

As shown in FIG. 2, the gate driving circuit includes a first pair P1 of first cascaded shift register unit IC1 and second cascaded shift register unit IC2 (e.g., the pair of IC1 and IC2 in the first row in FIG. 2) and a second pair P2 of first cascaded shift register unit IC1 and second cascaded shift register unit IC2 (e.g., the pair of IC1 and IC2 in the second row in FIG. 2) adjacent to the first pair P1. The first cascaded shift register unit IC1 in the first pair P1 is electrically coupled to the second cascaded shift register unit IC2 in the second pair P2, e.g., optionally the first cascaded shift register unit IC1 in the first pair P1 may be electrically coupled to the second cascaded shift register unit IC2 in the second pair P2 through a controller for transmitting a signal. The second cascaded shift register unit IC2 in the first pair P1 is electrically coupled to the first cascaded shift register unit IC1 in the second pair P2, e.g., optionally the second cascaded shift register unit IC2 in the first pair P1 may be directly electrically connected to the first cascaded shift register unit IC1 in the second pair P2 through a signal line for transmitting a signal. A first group of gate lines 21 connect the first cascaded shift register unit IC1 and second cascaded shift register unit IC2 in the first pair P1. A second groups of gate lines 22 connect that first cascaded shift register unit IC1 in the first pair P1 and the first cascaded shift register unit IC1 in the second pair P2.

As shown in FIG. 2, the display panel includes a plurality first pairs P1 of an odd numbered first cascaded shift register unit IC1 in the first column C1 and an odd numbered second cascaded shift register unit IC2 in the second column C2, and a plurality second pairs P2 of an even numbered second cascaded shift register unit IC2 in the first column C1 and an even number first cascaded shift register unit IC1 in the second column C2; the first pair P1 and the second pair P2 are alternately arranged.

In FIG. 2, a first group of gate lines 21 connect the first cascaded shift register unit IC1 and second cascaded shift register unit IC2 in the second pair P2. The number of gate lines 21 connecting the first cascaded shift register unit IC1 and second cascaded shift register unit IC2 in the first pair P1 is the same as the number of gate lines 21 connecting the first cascaded shift register unit IC1 and second cascaded shift register unit IC2 in the second pair P2. Optionally, the number of gate lines connecting the first cascaded shift register unit IC1 and second cascaded shift register unit IC2 in the first pair P1 is different from the number of gate lines connecting the first cascaded shift register unit IC1 and second cascaded shift register unit IC2 in the second pair P2. For example, the first cascaded shift register unit IC1 and second cascaded shift register unit IC2 in the second pair P2 may be connected by a third group of gate lines, the number of which is different from that of the first group of gate lines 21 in the first pair P1.

Referring to FIG. 2, the gate driving circuit in the embodiment includes a first column C1 of cascaded shift register units and a second column C2 of cascaded shift register units. The first column C1 and the second column C2 have a same number of cascaded shift register units. The first cascaded shift register unit IC1 in the first pair P1 is an odd numbered cascaded shift register unit in the first column C1, e.g., the first cascaded shift register unit in the first column C1. The second cascaded shift register unit IC2 in the first pair P1 is an odd numbered cascaded shift register unit in the second column C2, e.g., the first cascaded shift register unit in the second column C2. The first cascaded shift register unit IC1 in the second pair P2 is an even numbered cascaded shift register unit in the second column C2, e.g., the second cascaded shift register unit in the second column C2. The second cascaded shift register unit IC2 in the second pair P2 is an even numbered cascaded shift register unit in the first column C1, e.g., the second cascaded shift register unit in the first column C1. The first column C1 of cascaded shift register units includes a plurality of first cascaded shift register units IC1 and second cascaded shift register unit IC2, every odd numbered cascaded shift register unit is a first cascaded shift register unit IC1, and every even numbered cascaded shift register unit is a second cascaded shift register unit IC2. The second column C2 of cascaded shift register units includes a plurality of first cascaded shift register units IC1 and second cascaded shift register unit IC2, every even numbered cascaded shift register unit is a first cascaded shift register unit IC1, and every odd numbered cascaded shift register unit is a second cascaded shift register unit IC2.

Referring to FIG. 2, the gate driving circuit in the embodiment includes a repeating pattern of the first pair P1 and the second pair P2. The gate driving circuit is characterized by that each first cascaded shift register unit IC1 in each pair is connected by at least one gate line to each first cascaded shift register unit IC1 in each adjacent pair. For example, the first cascaded shift register unit IC1 in the second pair P2 is connected by the second group of gate lines 22 to the first cascaded shift register unit IC1 in the first pair P1, which is adjacent to the second pair P2. The first cascaded shift register unit IC1 in the second pair P2 is also connected by another second group of gate lines 22 to the first cascaded shift register unit IC1 in another adjacent pair (e.g., the pair in the third row).

Moreover, the gate driving circuit in FIG. 2 is also characterized by that each second cascaded shift register unit IC2 is electrically coupled to each first cascaded shift register unit IC1 in each adjacent pair (e.g., through a signal line or a controller for transmitting a signal), and each first cascaded shift register unit IC1 is electrically coupled to each second cascaded shift register unit IC2 in each adjacent pair (e.g., through a signal line or a controller for transmitting a signal). For example, the second cascaded shift register unit IC2 in the second pair P2 is electrically coupled to the first cascaded shift register unit IC1 in the first pair P1 and to the first cascaded shift register unit IC1 in another adjacent pair (e.g., the pair in the third row). The first cascaded shift register unit IC1 in the second pair P2 is electrically coupled to the second cascaded shift register unit IC2 in the first pair P1 as well as the first cascaded shift register unit IC1 in another adjacent pair (e.g., the pair in the third row).

Numerous alternative embodiments may be practiced to make the present gate driving circuit. Optionally, the number of gate lines connecting a first cascaded shift register unit IC1 and a second cascaded shift register unit IC2 in each pair may be the same. Optionally, the number of gate lines connecting the first cascaded shift register unit IC1 and the second cascaded shift register unit IC2 in each pair may be different. Optionally, the number of gate lines connecting each first cascaded shift register unit IC1 in each pair to each first cascaded shift register unit IC1 in each adjacent pair may be the same. Optionally, the number of gate lines connecting each first cascaded shift register unit IC1 in each pair to each first cascaded shift register unit IC1 in each adjacent pair may be different. Optionally, the display panel may include a gate driving circuit in which all cascaded shift register units are interconnected, e.g., the one shown in FIG. 2. Optionally, the display panel may include two or more gate driving circuit units assembled together, each of which is an interconnected gate driving circuit, e.g., the one shown in FIG. 2.

In some embodiments, the gate driving circuit may include a repeating pattern of the first pair P1 and the second pair P2 as shown in FIG. 2. Optionally, the number of gate lines connecting a first cascaded shift register unit IC1 and a second cascaded shift register unit IC2 in the first pair P1 is the same as that in the second pair P2 in the entire repeating pattern. Optionally, the number of gate lines connecting each first cascaded shift register unit IC1 in the first pair P1 to each first cascaded shift register unit IC1 in each adjacent second pair P2 are the same in the entire repeating pattern.

The gate driving circuit may have a different pattern of cascaded shift register units. In some embodiments, the gate driving circuit may include a repeating pattern of a first pair P1, a second pair P2, a third pair P3 and a fourth pair P4. Optionally, the number of gate lines connecting a first cascaded shift register unit IC1 and a second cascaded shift register unit IC2 in the first pair P1 is the same as that in the second pair P2, the number of gate lines connecting a first cascaded shift register unit IC1 and a second cascaded shift register unit IC2 in the third pair P3 is the same as that in the second pair P4, and the number of gate lines connecting a first cascaded shift register unit IC1 and a second cascaded shift register unit IC2 in the first pair P1 (or the second pair P2) is different from that in the third pair P3 (or the fourth pair P4). Optionally, the number of gate lines connecting each first cascaded shift register unit IC1 in the first pair P1 to each first cascaded shift register unit IC1 in an adjacent second pair P2 is different from that connecting each first cascaded shift register unit IC1 in the third pair P3 to each first cascaded shift register unit IC1 in an adjacent fourth pair P4.

In some embodiments, the number of gate lines connecting the first cascaded shift register unit IC1 and the second cascaded shift register unit IC2 in each pair are the same (e.g., the first group of gate lines 21) in the entire gate driving circuit pattern, and the number of gate lines connecting each first cascaded shift register unit IC1 in each pair to each first cascaded shift register unit IC1 in each adjacent pair are the same (e.g., the second group of gate lines 22) in the entire gate driving circuit pattern. Optionally, the first cascaded shift register unit IC1 connected to the first group of gate lines 21 is electrically coupled to a second cascaded shift register unit IC2 connected to an adjacent first group of gate lines 21. The second group of gate lines 22 connects two first cascaded shift register units IC1, each of which is connected to one of two adjacent first groups of gate lines 21.

Each first cascaded shift register unit IC1 provides gate scanning signals to gate lines connected thereto. Each second cascaded shift register unit IC2 provides gate scanning signals to gate lines connected thereto.

In the present gate driving circuit and the display panel having the same, the number of gate line driven by the first cascaded shift register unit is different from the number of gate lines driven by the second cascaded shift register unit, e.g., the first cascaded shift register unit provides gate scanning signals to more gate lines as compared to the second cascaded shift register unit. The first cascaded shift register unit completes application of gate scanning signals to gate lines connected thereto at a time different from that for the second cascaded shift register unit in a same pair. For example, the second cascaded shift register unit in a pair may complete application of gate scanning signals to gate lines connected thereto earlier than the first cascaded shift register unit in the same pair. By having this design, the abrupt difference between $V_{on}$ and $V_{g1}$ when switching gate integrated circuit units may be eliminated, thereby obviating technical problems such as split screen and H-block.

In some embodiments, the first cascaded shift register unit IC1 in the first pair P1 is configured to provide a first signal S1 to the second cascaded shift register unit IC2 in the second pair P2 when the first cascaded shift register unit IC1 in the first pair P1 completes application of gate scanning signal to gate lines connected thereto. The second cascaded shift register unit IC2 in the first pair P1 is configured to provide a second signal S2 to the first cascaded shift register unit IC1 in the second pair P2 when the second cascaded shift register unit IC2 in the first pair P1 completes application of gate scanning signal to gate lines connected thereto. The display panel in FIG. 2 further includes a delay controller 23 connected to the first cascaded shift register unit IC1 and the second cascaded shift register unit IC2 in the first pair P1, respectively. Upon receiving the first signal S1 and the second signal S2 from the first cascaded shift register unit IC1 and the second cascaded shift register unit IC2 in the first pair P1, respectively, the delay controller 23 is configured to synchronize application of gate scanning signals by the first cascaded shift register unit IC1 and the second cascaded shift register unit IC2 of the second pair P2 to the group of gate lines connecting the second pair P2 (e.g., a group of gate lines 21 connecting the second pair P2 in FIG. 2). For example, under the control of the delay controller 23, the first cascaded shift register unit IC1 and the second cascaded shift register unit IC2 in the second pair P2 apply gate scanning signals to the group of gate lines connecting the second pair P2 (e.g., a group of gate lines 21 connecting the second pair P2 in FIG. 2) substantially at the same time.

In some embodiments, each first gate line in the first group of gate lines 21 connecting a pair of first cascaded shift register unit IC1 and second cascaded shift register unit IC2 is driven by both the first cascaded shift register unit IC1 and the second cascaded shift register unit IC2 in the same pair at the same time, e.g., the first cascaded shift register unit IC1 and the second cascaded shift register unit IC2 in the same pair provide gate scanning signals to each first gate line in the first group of gate lines 21 connecting the pair at the same time. Each first cascaded shift register unit IC1 provides gate scanning signals to gate lines in the first group of gate lines 21 and gate lines in the second group of gate lines 22, e.g., each first cascaded shift register unit IC1 provides gate scanning signals to both (1) gate lines connecting the first cascaded shift register unit IC1 and the second circuit IC2 in a same pair; and (2) gate lines connecting the first cascaded shift register units IC1 in adjacent pairs. Each second cascaded shift register unit IC2 only provides gate scanning signals to gate lines in the second group of gate lines 22, e.g., each second cascaded shift register unit IC2 only provides gate scanning signals to gate lines connecting the first cascaded shift register unit IC1 and the second circuit IC2 in a same pair.

In the present gate driving circuit and the display panel having the same, the delay controller 23 synchronizes application of gate scanning signals by the first cascaded shift register unit IC1 and second cascaded shift register unit IC2 in a same pair to the group of gate lines connecting the same pair, based on the first signal S1 and the second signal S2 generated in a previous pair. By having an interactive signal control mechanism, it obviates technical problems associated with out-of-phase gate voltages caused by unsynchronized switching of gate integrated circuit units.

Referring to FIG. 2, the gate driving circuit in the embodiment includes four first groups of gate line 21, three second groups of gate line 22, four first cascaded shift register units IC1 and four second cascaded shift register units IC2.

A second group of gate lines 22 is disposed between every two first groups of gate lines 21.

Referring to FIG. 2, in plan view of the display panel, the first group of gate lines 21 in the first row R1 is connected to a first cascaded shift register unit IC1 in the first row R1 on the left side of the display panel, and is connected to a second cascaded shift register unit IC2 in the first row R1 on the right side of the display panel. A second group of gate lines 22 shared by the first row R1 and the second row R2 is connected to the first cascaded shift register unit IC1 on the left side of the first row R1, and is connected to the first cascaded shift register unit IC1 on the right side of the second row R2.

In plan view of the display panel, the first group of gate lines 21 in the second row R2 is connected to a second cascaded shift register unit IC2 in the second row R2 on the left side of the display panel, and is connected to a first cascaded shift register unit IC1 in the second row R2 on the right side of the display panel. A second group of gate lines 22 shared by the second row R2 and the third row R3 is connected to the first cascaded shift register unit IC1 on the right side of the second row R2, and is connected to the first cascaded shift register unit IC1 on the left side of the third row R3.

In plan view of the display panel, the first group of gate lines 21 in the third row R3 is connected to a first cascaded shift register unit IC1 in the third row R3 on the left side of the display panel, and is connected to a second cascaded shift register unit IC2 in the third row R3 on the right side of the display panel. A second group of gate lines 22 shared by the third row R3 and the fourth row R4 is connected to the first cascaded shift register unit IC1 on the left side of the third row R3, and is connected to the first cascaded shift register unit IC1 on the right side of the fourth row R4.

In plan view of the display panel, the first group of gate lines 21 in the fourth row R4 is connected to a second cascaded shift register unit IC2 in the fourth row R4 on the left side of the display panel, and is connected to a first cascaded shift register unit IC1 in the fourth row R4 on the right side of the display panel.

The first cascaded shift register unit IC1 in the first row R1 (connected to the first group of gate lines 21 in the first row R1 on the left side of the display panel) is electrically coupled to the second cascaded shift register unit IC2 in the second row R2, and is also electrically coupled to the delay controller 23 for receiving a first start vertical signal STV1 (described in more details in following sections) output from a timing controller, which is a component of the delay controller 23. The second cascaded shift register unit IC2 in the first row R1 (connected to the first group of gate lines 21 in the first row R1 on the right side of the display panel) is electrically coupled to the first cascaded shift register unit IC1 in the second row R2, and is also electrically coupled to the delay controller 23 for receiving a second start vertical signal STV2 (described in more details in following sections) output from the timing controller, which is a component of the delay controller 23.

The first cascaded shift register unit IC1 in the second row R2 (connected to the first group of gate lines 21 in the second row R2 on the right side of the display panel) is electrically coupled to the second cascaded shift register units IC2 in adjacent rows (e.g., the first row R1 and the third row R3). The first cascaded shift register unit IC1 in third row R3 (connected to the first group of gate lines 21 in the third row R3 on the left side of the display panel) is electrically coupled to the second cascaded shift register units IC2 in adjacent rows (e.g., the second row R1 and the fourth row R3). The first cascaded shift register unit IC1 in fourth row R4 (connected to the first group of gate lines 21 in the fourth row R3 on the right side of the display panel) is electrically coupled to the second cascaded shift register units IC2 in an adjacent row (e.g., the third row R3).

When the gate driving circuit as shown in FIG. 2 is in operation, the delay controller 23 is connected to the first cascaded shift register unit and the second cascaded shift register unit in the first pair P1, respectively. The first cascaded shift register unit IC1 in the first pair P1 (which is connected to the first group of gate lines 21 in the first row R1) is configured to provide a first signal S1 to the delay controller when the first cascaded shift register unit IC1 in the first pair P1 completes application of gate scanning signal to gate lines connected thereto. The second cascaded shift register unit IC2 in the first pair P1 (which is connected to the first group of gate lines 21 in the first row R1) is configured to provide a second signal S2 to the first cascaded shift register unit IC1 in the second pair P2 and the delay controller 23 when the second cascaded shift register unit IC2 in the first pair P1 completes application of gate scanning signal to gate lines connected thereto. Upon receiving the first signal S1 from the first cascaded shift register unit IC1 in the first pair P1 and the second signal S2 from the second cascaded shift register unit IC2 in the first pair P1, the delay controller 23 is configured to synchronize application of gate scanning signals by the second pair P2 of first cascaded shift register unit IC1 and second cascaded shift register unit IC2 to a group of gate lines connecting the second pair P2 (e.g., the group of gate lines 21 in the second row R2). As shown in FIG. 2, the first group of gate lines 21 in the first row R1 includes nine gate lines, the second group of gate lines 22 shared by the first row R1 and the second row R2 includes two gate lines. When the first cascaded shift register unit IC1 in the first pair P1 (which is connected to the first group of gate lines 21 in the first row R1) completes application of gate scanning signal to gate lines connected thereto (including nine gate lines 21 in the first row R1 and two gate lines 22 shared by the first row R1 and the second row R2), it provides a first signal S1 to the delay controller 23. When the second cascaded shift register unit IC2 in the first pair P1 (which is connected to the first group of gate lines 21 in the first row R1) completes application of gate scanning signal to gate lines connected thereto (including nine gate lines 21 in the first row R1), it provides a second signal S2 to the delay controller 23. Upon receiving the second signal S2, the delay controller generates a delay control signal. When the first signal S1 and the delay control signal are both valid, the delay controller turns on the second cascaded shift register unit IC2 in the second pair P2, for applying gate scanning signal to gate lines connected thereto, thereby synchronizing application of gate scanning signals by the second pair P2 of first cascaded shift register unit IC1 and second cascaded shift register unit IC2 to a group of gate lines connecting the second pair P2 (e.g., the group of gate lines 21 in the second row R2).

In some embodiments, a delay occurs for the second cascaded shift register unit IC2 in the first pair P1 (which is connected to the first group of gate lines 21 in the first row R1) to complete application of gate scanning signal to gate lines connected thereto, whereas no delay occurs for the first cascaded shift register unit IC1 in the first pair P1 (which is connected to the first group of gate lines 21 in the first row R1) to complete application of gate scanning signal to gate lines connected thereto, application of gate scanning signals to a group of gate lines connecting the second pair P2 of first cascaded shift register unit IC1 and second cascaded shift register unit IC2 may be unsynchronized. According to the present disclosure, when the second cascaded shift register unit IC2 in the first pair P1 provides a second signal S2 to the delay controller 23 when it completes application of gate scanning signal to gate lines connected thereto, the delayer controller 23 process the second signal S2 and output a delay control signal S2_out. Meanwhile, the first cascaded shift register unit IC1 in the first pair P1 provides a first signal S1 to the delay controller 23 when it completes application of gate scanning signal to gate lines connected thereto. Even though there may be a delay in generating the S2_out as compared to the S1 received by the delay controller 23 (i.e., S2_out is later in time than S1), a delay may exist between the S1 received by the delay controller 23 and the S2_out generated by the delay controller, the second cascaded shift register unit IC2 in the second pair P2 (e.g., on the left side of the display panel in second row of FIG. 2) may only be turned on when the first signal S1 and the delay control signal S2_out are both valid. By this design, the application of gate scanning signals by the second pair P2 of first cascaded shift register unit IC1 and second cascaded shift register unit IC2 to a group of gate lines connecting the second pair P2 may be synchronized. Similarly, even if there is a delay in receiving the S1 signal by the delay controller 23 as compared to the S2_out generated by the delay controller 23 (i.e., S1 is later in time than S2_out), the second cascaded shift register unit IC2 in the second pair P2 (e.g., on the left side of the display panel in second row of FIG. 2) may only be turned on when the first signal S1 and the delay control signal S2_out are both valid. By this design, the application of gate scanning signals by the second pair P2 of first cascaded shift register unit IC1 and second cascaded shift register unit IC2 to a group of gate lines connecting the second pair P2 may be synchronized.

Referring to FIG. 2, the first cascaded shift register unit IC1 in the first pair P1 is on the left side of the display panel, and the second cascaded shift register unit IC2 in the first pair P1 is on the right side of the display panel. The first cascaded shift register unit IC1 in the second pair P2 is on the right side of the display panel, and the second cascaded shift register unit IC2 in the second pair P2 is on the left side of the display panel. Various alternative embodiments may be practiced. For example, in some embodiments, the first cascaded shift register unit IC1 in the first pair P1 is on the right side of the display panel, and the second cascaded shift register unit IC2 in the first pair P1 is on the left side of the display panel; the first cascaded shift register unit IC1 in the second pair P2 is on the left side of the display panel, and the second cascaded shift register unit IC2 in the second pair P2 is on the right side of the display panel.

Figure 3:
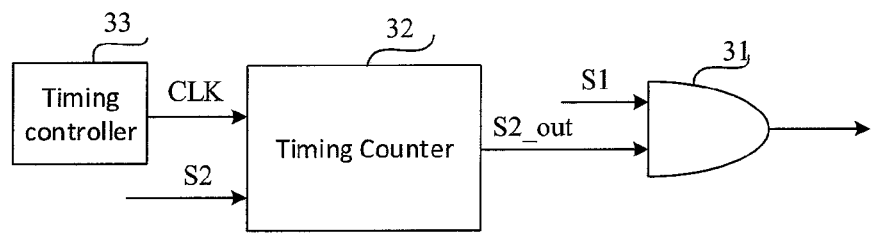
FIG. 3 is a diagram illustrating the structure of a delay controller in some embodiments.

FIG. 3 is a diagram illustrating the structure of a delay controller in some embodiments. Referring to FIG. 3, the delay controller 23 includes an AND gate 31, a timing controller 33, and a timing counter 32. The timing controller 33 generates a delay clock signal CLK. The timing counter 32 generates a delay control signal S2_out based on the delay clock signal CLK and the second signal S2 provided by the second cascaded shift register unit IC2 in the first pair P1.

The first input terminal of the AND gate 31 is configured to receive the first signal S1 provided by the first cascaded shift register unit IC1 in the first pair P1 (which is connected to the first group of gate lines 21 in the first row R1), the second input terminal of the AND gate 31 is configured to receive the delay control signal S2_out provided by the timing counter 32, and the output terminal of the AND gate 31 is connected to the second cascaded shift register unit IC2 in the second pair P2 (not shown in FIG. 3; which is connected to the first group of gate lines 21 in the second row R2). When the first signal S1 and the delay control signal S2_out are both valid, the AND gate 31 outputs a control signal to turn on the second cascaded shift register unit IC2 in the second pair P2 for applying gate scanning signal to gate lines connected thereto (e.g., the first group of gate lines 21 in the second row P2).

In the present gate driving circuit and the display panel having the same, the delay controller 23 generates a delay control signal S2_out based on the second signal S2 provided by the second cascaded shift register unit IC2 in the first pair P1. The second cascaded shift register unit IC2 in the second pair P2 is controlled to be in an ON state through the AND gate when the first signal S1 and the delay control signal S2_out are both valid. Accordingly, the issue of unsynchronized application of gate scanning signals to a group of gate lines connecting the second pair P2 of first cascaded shift register unit IC1 and second cascaded shift register unit IC2 may be obviated. By having this design, the application of gate scanning signals by the second pair P2 of first cascaded shift register unit IC1 and second cascaded shift register unit IC2 to a group of gate lines connecting the second pair P2 may be synchronized.

Figure 4:
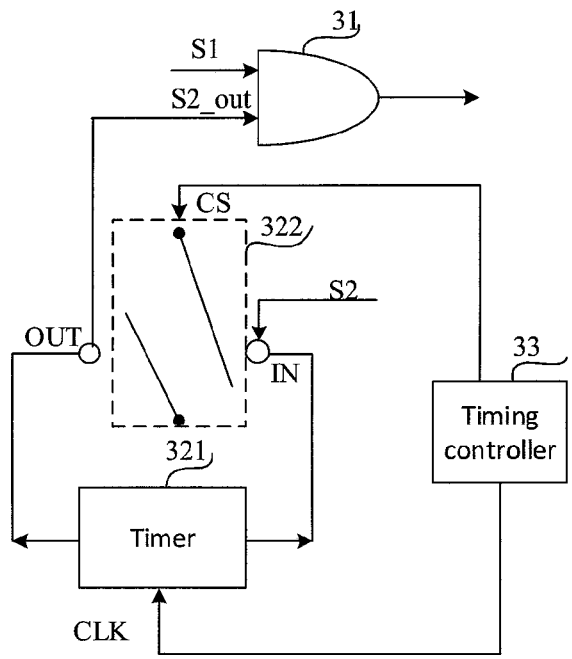
FIG. 4 is a diagram illustrating the structure of a delay controller in some embodiments.

FIG. 4 is a diagram illustrating the structure of a delay controller in some embodiments. Referring to FIG. 4, the timing counter 32 includes a timer 321 and an input-output selector 322. The timing controller 33 is configured to generate an input-output selection signal CS. The timer 321 includes an input node IN and an output node OUT. Upon receiving the delay clock signal CLK, the timer 321 determines a delay period based on the delay clock signal CLK, delays the second signal S2 input from the input node IN by the delay period, and outputs the delay control signal S2_out to the output node OUT. Upon receiving the input-output selection signal CS, the input-output selector 322 controls an electrical connection between the input node IN and the second cascaded shift register unit IC2 in the first pair P1 for inputting the second signal S2, and controls an electrical connection between the output node OUT and the second input terminal of the AND gate 31 for outputting the delay control signal S2_out.

As shown in FIG. 4, the timing controller 33 generates the input-output selection signal CS and the delay clock signal CLK. The timer 321 determines the delay period based on the delay clock signal CLK. The input-output selector 322 controls electrical connections of the input node IN and the output node OUT with corresponding cascaded shift register units, respectively, based on the put-output selection signal CS.

In some embodiments, the gate driving circuit further includes a protection diode having an anode connected to the second cascaded shift register unit IC2 in the first pair P1 for receiving the second signal S2 and a cathode connected to the input node IN of the timer 321.

To reduce the number of signal lines in the peripheral layout of the display panel, a same signal line may be used for transmitting the input signal and the output signal for timing counter 32. By having a protection diode attached to the output terminal of the second cascaded shift register unit IC2 in the gate driving circuit, unintended turning-on of the first cascaded shift register unit IC1 may be prevented.

In some embodiments, the first cascaded shift register unit IC1 in the first pair P1 (which is connected to the first group of gate lines 21 in the first row R1) and the second cascaded shift register unit IC2 in the second pair P2 (which is connected to the first group of gate lines 21 in the second row R2) are on a first side of the display panel; and the second cascaded shift register unit of the first pair P1 and the first cascaded shift register unit of the second pair P2 are on a second side of the display panel. Optionally, the first cascaded shift register unit IC1 in the first pair P1 and the second cascaded shift register unit IC2 in the second pair P2 are on the left side of the display panel; and the second cascaded shift register unit of the first pair P1 and the first cascaded shift register unit of the second pair P2 are on the right side of the display panel. Optionally, the first cascaded shift register unit IC1 in the first pair P1 and the second cascaded shift register unit IC2 in the second pair P2 are on the right side of the display panel; and the second cascaded shift register unit of the first pair P1 and the first cascaded shift register unit of the second pair P2 are on the left side of the display panel.

In some embodiments, when the input-output selection signal CS is a first voltage signal, the input node IN of the timer 321 is connected to the second cascaded shift register unit IC2 in the first pair P1 on the second side, and the output node OUT of the timer 321 is connected to the second cascaded shift register unit IC2 in the second pair P2 on the first side. In some embodiments, when the input-output selection signal CS is a second voltage signal, the input node IN of the timer 321 is connected to the second cascaded shift register unit IC2 in the second pair P2 on the first side, and the output node OUT of the timer 321 is connected to the second cascaded shift register unit IC2 in the first pair P1 on the second side.

Optionally, the first side is the left side of the display panel, and the second side is the right side of the display panel. Optionally, when the input-output selection signal CS is a first voltage signal, the input node IN of the timer 321 is connected to the second cascaded shift register unit IC2 in the first pair P1 on the right side, and the output node OUT of the timer 321 is connected to the second cascaded shift register unit IC2 in the second pair P2 on the left side. Optionally, when the input-output selection signal CS is a second voltage signal, the input node IN of the timer 321 is connected to the second cascaded shift register unit IC2 in the second pair P2 on the left side, and the output node OUT of the timer 321 is connected to the second cascaded shift register unit IC2 in the first pair P1 on the right side.

Optionally, the first side is the right side of the display panel, and the second side is the left side of the display panel. Optionally, when the input-output selection signal CS is a first voltage signal, the input node IN of the timer 321 is connected to the second cascaded shift register unit IC2 in the first pair P1 on the left side, and the output node OUT of the timer 321 is connected to the second cascaded shift register unit IC2 in the second pair P2 on the right side. Optionally, when the input-output selection signal CS is a second voltage signal, the input node IN of the timer 321 is connected to the second cascaded shift register unit IC2 in the second pair P2 on the right side, and the output node OUT of the timer 321 is connected to the second cascaded shift register unit IC2 in the first pair P1 on the left side.

Optionally, the first voltage level is a high voltage level, and the second voltage level is a low voltage level. Optionally, the first voltage level is a low voltage level, and the second voltage level is a high voltage level. By switching the input-output selection signal CS between a high voltage level and a low voltage level, electrical connections of the input node IN and the output node OUT may be specifically defined.

In some embodiments, the delay clock signal CLK determines a number of delay steps in the delay period provided by the timer 321. In some embodiments, when the second cascaded shift register unit IC2 in the first pair P1 completes application of gate scanning signal to gate lines connected thereto earlier than the first cascaded shift register unit IC1 in the first pair P1 completes application of gate scanning signal to gate lines connected thereto by N clock pulse vertical (CPV) signals, the number of delay steps is determined to be N.

Figure 5:
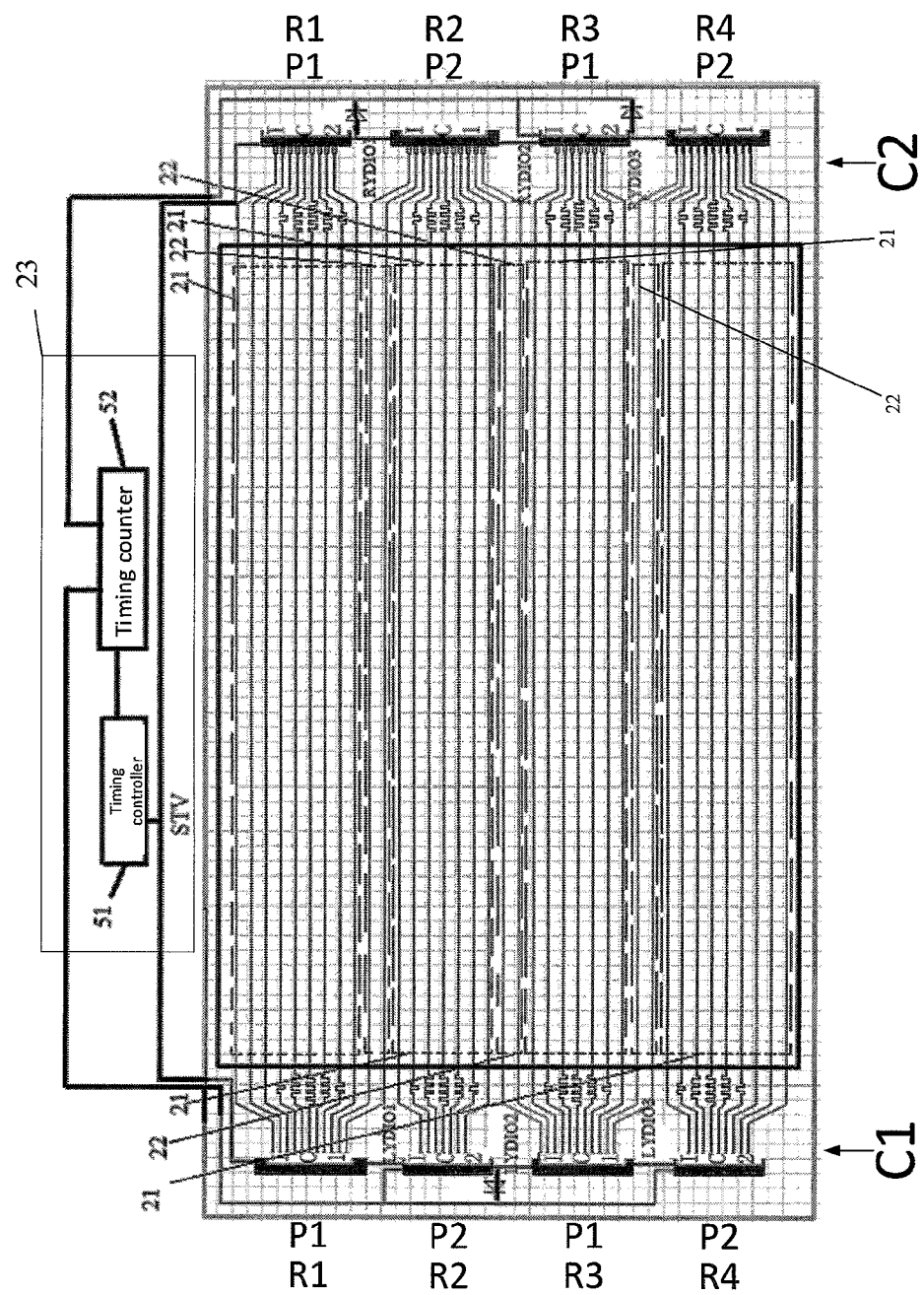
FIG. 5 is a diagram illustrating the structure of a gate driving circuit of a display panel in some embodiments.

FIG. 5 is a diagram illustrating the structure of a gate driving circuit of a display panel in some embodiments. Referring to FIG. 5, the display panel in the embodiment includes a plurality of gate lines (e.g., gate lines 21 and gate lines 22) and a gate driving circuit for driving the plurality of gate lines. The gate driving circuit in the embodiment includes a plurality of first cascaded shift register units IC1 and a plurality of second cascaded shift register units IC2 for applying gate scanning signals to gates lines connected thereto. The plurality of gate lines at least includes two adjacent first groups of gate lines 21 and a second group of gate lines 22 between the two adjacent first groups of gate lines 21.

In FIG. 5, each first group of gate lines 21 (e.g., the first groups of gate lines 21 in the first row R1, the second row R2, the third row R3, and the fourth row R4) connects a pair of first cascaded shift register unit IC1 and second cascaded shift register unit IC2 (e.g., the pairs of IC1 and IC2 in the first row R1, the second row R2, the third row R3, and the fourth row R4).

A first cascaded shift register unit IC1 in a pair of IC1 and IC2 is electrically coupled to a second cascaded shift register unit IC2 in an adjacent pair of IC1 and IC2. For example, the first cascaded shift register unit IC1 in the first pair P1 is electrically coupled to the second cascaded shift register unit IC2 in the adjacent second pair P2. The first cascaded shift register unit IC1 in the second pair P2 is electrically coupled to the second cascaded shift register unit IC2 in the adjacent first pair P1, and is electrically coupled to the second cascaded shift register unit IC2 in the adjacent third pair P3. The first cascaded shift register unit IC1 in the third pair P3 is electrically coupled to the second cascaded shift register unit IC2 in the adjacent second pair P2, and is electrically coupled to the second cascaded shift register unit IC2 in the adjacent fourth pair P4. The first cascaded shift register unit IC1 in the fourth pair P4 is electrically coupled to the second cascaded shift register unit IC2 in the adjacent third pair P3.

Each second group of gate lines 22 connects two first cascaded shift register units IC1 from two adjacent pairs of IC1 and IC2. For example, the second group of gate lines 22 shared by the first row R1 and the second row R2 connects two first cascaded shift register units IC1 from the first pair P1 and the second pair P2. The second group of gate lines 22 shared by the second row R2 and the third row R3 connects two first cascaded shift register units IC1 from the second pair P2 and the third pair P3. The second group of gate lines 22 shared by the third row R3 and the fourth row R4 connects two first cascaded shift register units IC1 from the third pair P3 and the fourth pair P4.

Referring to FIG. 5, the gate driving circuit in the embodiment includes a first column C1 of cascaded shift register units and a second column C2 of cascaded shift register units. The first column C1 and the second column C2 have a same number of cascaded shift register units. The first cascaded shift register unit IC1 in the first pair P1 is an odd numbered cascaded shift register unit in the first column C1, e.g., the first cascaded shift register unit in the first column C1. The second cascaded shift register unit IC2 in the first pair P1 is an odd numbered cascaded shift register unit in the second column C2, e.g., the first cascaded shift register unit in the second column C2. The first cascaded shift register unit IC1 in the second pair P2 is an even numbered cascaded shift register unit in the second column C2, e.g., the second cascaded shift register unit in the second column C2. The second cascaded shift register unit IC2 in the second pair P2 is an even numbered cascaded shift register unit in the first column C1, e.g., the second cascaded shift register unit in the first column C1. The first column C1 of cascaded shift register units includes a plurality of first cascaded shift register units IC1 and second cascaded shift register unit IC2, every odd numbered cascaded shift register unit is a first cascaded shift register unit IC1, and every even numbered cascaded shift register unit is a second cascaded shift register unit IC2. The second column C2 of cascaded shift register units includes a plurality of first cascaded shift register units IC1 and second cascaded shift register unit IC2, every even numbered cascaded shift register unit is a first cascaded shift register unit IC1, and every odd numbered cascaded shift register unit is a second cascaded shift register unit IC2.

As shown in FIG. 5, the display panel includes a plurality first pairs P1 of an odd numbered first cascaded shift register unit IC1 in the first column C1 and an odd numbered second cascaded shift register unit IC2 in the second column C2, and a plurality second pairs P2 of an even numbered second cascaded shift register unit IC2 in the first column C1 and an even number first cascaded shift register unit IC1 in the second column C2; the first pair P1 and the second pair P2 are alternately arranged.

When the first cascaded shift register unit IC1 from the first pair P1 completes application of gate scanning signals to gate lines connected thereto, it provides a gate driver control signal LYOIO1 to the delay controller 23 (and in turn controls the turning on of the second cascaded shift register unit IC2 in the second pair P2). When the second cascaded shift register unit IC2 in the first pair P1 completes application of gate scanning signals to gate lines connected thereto, it provides a gate driver control signal RYOIO1 to the first cascaded shift register unit IC1 in the second pair P2 for turning on the first cascaded shift register unit IC1 in the second pair P2, it also provides the gate driver control signal RYOIO1 to the delay controller 23 (and in turn controls the turning on of the second cascaded shift register unit IC2 in the second pair P2). When the second cascaded shift register unit IC2 in the second pair P2 completes application of gate scanning signals to gate lines connected thereto, it provides a gate driver control signal LYOIO2 to the first cascaded shift register unit IC1 in the third pair P3 for turning on the first cascaded shift register unit IC1 in the third pair P3, it also provides the gate driver control signal LYOIO2 to the delay controller 23 (and in turn controls the turning on of the second cascaded shift register unit IC2 in the third pair P3). When the first cascaded shift register unit IC1 in the second pair P2 completes application of gate scanning signals to gate lines connected thereto, it provides a gate driver control signal RYDIO2 to the delay controller 23 (and in turn controls the turning on of the second cascaded shift register unit IC2 in the third pair P3). When the first cascaded shift register unit IC1 in the third pair P3 completes application of gate scanning signals to gate lines connected thereto, it provides a gate driver control signal LYDIO3 to the delay controller 23 (and in turn controls the turning on of the second cascaded shift register unit IC2 in the fourth pair P4). When the second cascaded shift register unit IC2 in the third pair P3 completes application of gate scanning signals to gate lines connected thereto, it provides a gate driver control signal RYOIO3 to the first cascaded shift register unit IC1 in the fourth pair P4 for turning on the first cascaded shift register unit IC1 in the fourth pair P4, it also provides the gate driver control signal RYOIO3 to the delay controller 23 (and in turn controls the turning on of the second cascaded shift register unit IC2 in the fourth pair P4).

As shown in FIG. 5, the delay controller 23 in the embodiment includes a timing controller 51, a timing counter 52, and an AND gate (not shown in FIG. 5). The timing controller 51 provides a start vertical signal STV1 to the first cascaded shift register unit IC1 in the first pair P1 and a start vertical signal STV2 to the second cascaded shift register unit IC2 in the first pair P1. The timing controller 51 provides a delay clock signal CLK and an input-output selection signal CS to the timing counter 52.

Thus, an interactive signal control mechanism between cascaded shift register units on two sides of the display panel may be achieved by the timing counter 52 through gate driver control YDIO signals. By having an interactive signal control mechanism, it obviates technical problems associated with out-of-phase gate voltages caused by unsynchronized switching of gate integrated circuit units. For example, when the second cascaded shift register unit IC2 in the first pair P1 completes application of gate scanning signals to gate lines connected thereto and provides a gate driver control signal RYOIO1, the timing controller 51 outputs a CLK signal and a CS signal, as discussed above. The CS signal determines input and output pathways, the CLK determines a delay period, synchronizing RYDIO1 and LYDIO1. The second cascaded shift register unit IC2 in the second pair P2 may only be turned on when LYDIO1 and the delay control signal output by the timing controller 52 are both valid.

Similarly, when the second cascaded shift register unit IC2 in the second pair P2 completes application of gate scanning signals to gate lines connected thereto and provides a gate driver control signal LYOIO2, an interactive signal control may be applied to control the second cascaded shift register unit IC2 in the third pair P3. For example, when the second cascaded shift register unit IC2 in the second pair P2 completes application of gate scanning signals to gate lines connected thereto and provides a gate driver control signal LYOIO2, the timing controller 51 outputs a CLK signal and a CS signal, as discussed above. The CS signal determines input and output pathways, the CLK determines a delay period, synchronizing LYOIO2 and RYDIO2. The second cascaded shift register unit IC2 in the third pair P3 may only be turned on when RYDIO2 and the delay control signal output by the timing controller 52 are both valid.

To reduce the number of signal lines in the peripheral layout of the display panel, a same signal line may be used for transmitting the input signal and the output signal for timing counter 52. Because the first cascaded shift register unit IC1 may be turned on by YDIO alone, it may be inadvertently turned on when a same signal line is used for transmitting the input signal and the output signal for timing counter 52. Accordingly, a protection diode may be attached to the output terminal of the second cascaded shift register unit IC2 in the gate driving circuit. By having such a protection diode, unintended turning-on of the first cascaded shift register unit IC1 may be prevented.

Figure 6:
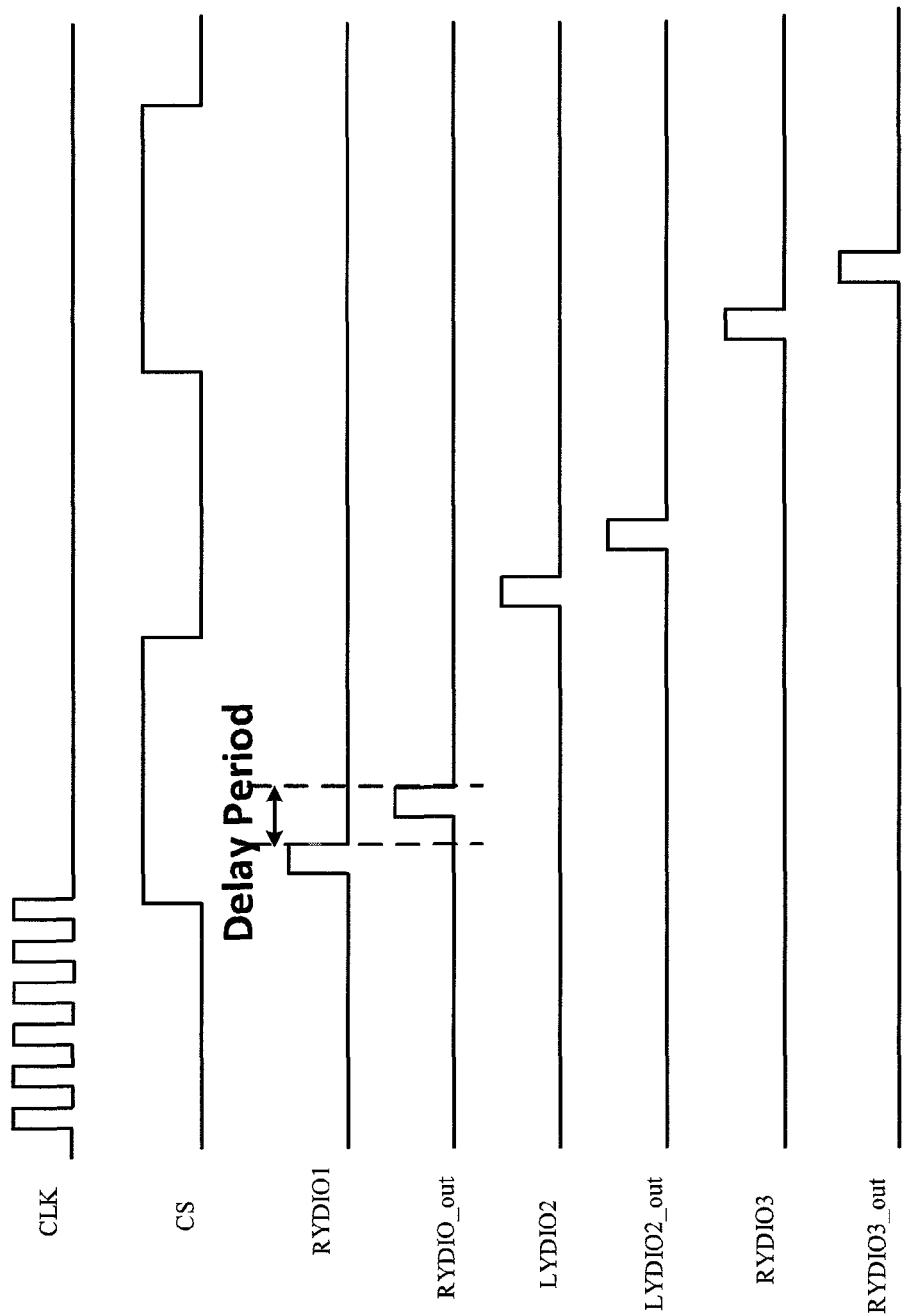
FIG. 6 is a timing diagram illustrating an operation of a gate driving circuit in some embodiments.

FIG. 6 is a timing diagram illustrating an operation of a gate driving circuit in some embodiments. Referring to FIG. 6, the input-output selection signal determines electrical connections of the input node IN and the output node OUT. In some embodiments, the CS signal is a high voltage level, the input node of the timer is electrically connected to the second cascaded shift register unit IC2 on the right side of the display panel (e.g., the second cascaded shift register unit IC2 in the first pair P1 or the second cascaded shift register unit IC2 in the third pair P3), the output node of the timer is electrically connected to the second cascaded shift register unit IC2 on the left side of the display panel (e.g., the second cascaded shift register unit IC2 in the second pair P2 or the second cascaded shift register unit IC2 in the fourth pair P4). The RYDIO signal generated by the second cascaded shift register unit IC2 on the right side of the display panel is delayed to generate a delayed control signal. The delayed control signal and the LYDIO signal generated by the first cascaded shift register unit IC1 on the left side of the display panel (e.g., the first cascaded shift register unit IC1 in the first pair P1 or the first cascaded shift register unit IC1 in the third pair P3) control the turning on of the second cascaded shift register unit IC2 on the left side of the display panel (e.g., the second cascaded shift register unit IC2 in the second pair P2 or the second cascaded shift register unit IC2 in the fourth pair P4). In some embodiments, the CS signal is a low voltage level, the input node of the timer is electrically connected to the second cascaded shift register unit IC2 on the left side of the display panel (e.g., the second cascaded shift register unit IC2 in the second pair P2), the output node of the timer is electrically connected to the second cascaded shift register unit IC2 on the right side of the display panel (e.g., the second cascaded shift register unit IC2 in the third pair P2). The LYDIO signal generated by the second cascaded shift register unit IC2 on the left side of the display panel is delayed to generate a delayed control signal. The delayed control signal and the RYDIO signal generated by the first cascaded shift register unit IC1 on the right side of the display panel (e.g., the first cascaded shift register unit IC1 in the second pair P2) control the turning on of the second cascaded shift register unit IC2 on the right side of the display panel (e.g., the second cascaded shift register unit IC2 in the third pair P3). The CLK signal determines a number of delay steps in the delay period for the YDIO signal, and thus determines the delay period of the timer. The number of delay steps is determined by the clock difference between clock pulse vertical signals for cascaded shift register units on two sides of the display panel, respectively. For example, the second cascaded shift register unit in the first pair P1 completes application of gate scanning signal to gate lines connected thereto earlier than the first cascaded shift register unit in the first pair P1 completes application of gate scanning signal to gate lines connected thereto by two CPV signals, then the number of delay steps is determined to be 2.

Referring to FIG. 6, RYDIO1_out is a first delay control signal output by the timing counter, i.e., RYDIO1_out is a signal obtained by delaying RYDIO1 by a delay period. LYDIO2_out is a second delay control signal output by the timing counter, i.e., LYDIO2_out is a signal obtained by delaying LYDIO2 by a delay period. RYDIO3_out is a third delay control signal output by the timing counter, i.e., RYDIO3_out is a signal obtained by delaying RYDIO3 by a delay period.

When the gate driving circuit as shown in FIG. 5 is in operation, when RYDIO1_out and LYDIO2 are both valid, the second cascaded shift register unit in the second pair P2 (on the left side of the display panel) may be turned on for applying gate scanning signal to gate lines connected thereto. When LYDIO2_out and RYDIO2 are both valid, the second cascaded shift register unit in the third pair P3 (on the right side of the display panel) may be turned on for applying gate scanning signal to gate lines connected thereto. When RYDIO3_out and LYDIO3 are both valid, the second cascaded shift register unit in the fourth pair P4 (on the left side of the display panel) may be turned on for applying gate scanning signal to gate lines connected thereto.

In some embodiments, the second cascaded shift register unit IC2 has a novel structure. For example, when the first cascaded shift register unit IC1 completes application of gate scanning signal to gate lines connected thereto and outputs a YDIO1 signal, the first cascaded shift register unit IC1 in the second pair P2 has already started its application of gate scanning signal to gate lines connected thereto. Because cascaded shift register units on two sides of the display panel are switched on at different times, application of gate scanning signals to gate lines connecting the cascaded shift register units on two sides of the display panel may be unsynchronized, e.g., application of gate scanning signals to a group of gate lines connecting the second pair P2 of first cascaded shift register unit IC1 and second cascaded shift register unit IC2 may be unsynchronized. To resolve this issue, the present disclosure provides a novel structure of second cascaded shift register unit IC2 to resolve the issue of unsynchronized application of gate scanning signals on two sides of the display panel.

Figure 7:
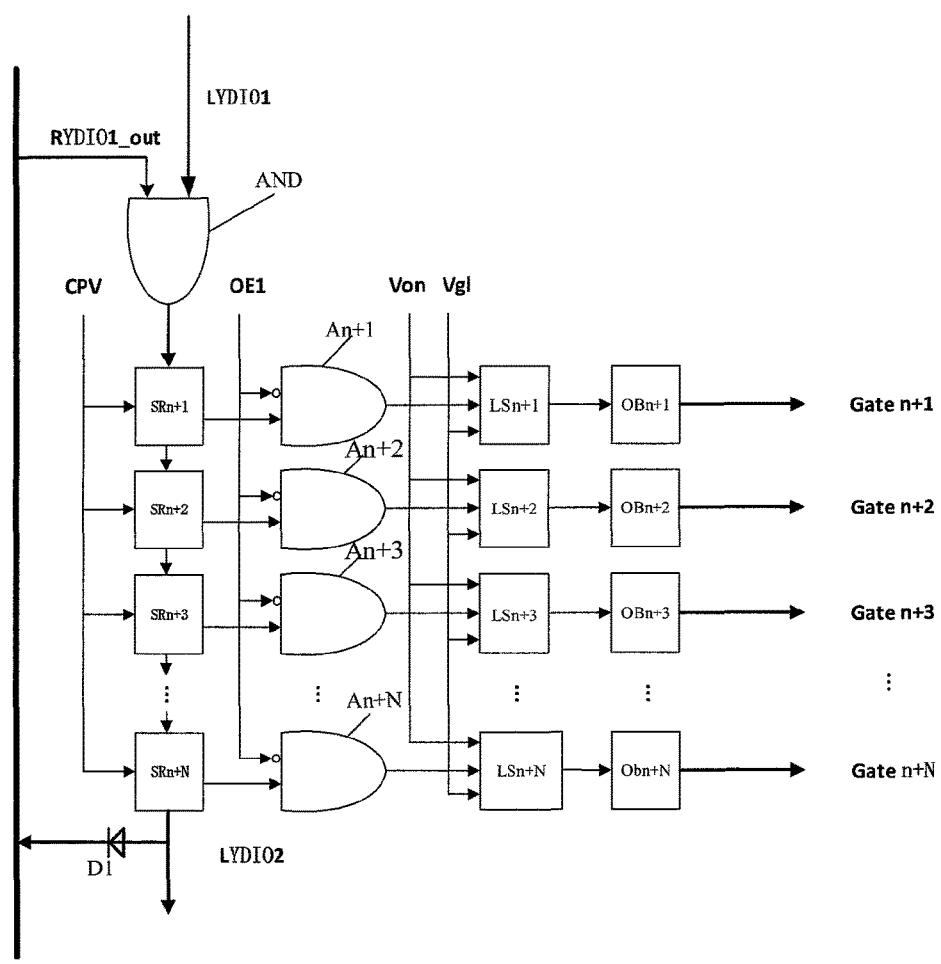
FIG. 7 is a diagram illustrating the structure of a second cascaded shift register unit in some embodiments.

FIG. 7 is a diagram illustrating the structure of a second cascaded shift register unit in some embodiments. Referring to FIG. 7, the second cascaded shift register unit IC2 in the embodiment (e.g., the second cascaded shift register unit IC2 in the first pair P1 in FIG. 5) is combined with an AND gate AND (i.e., the AND gate as a component of the delay controller).

In some embodiments, the second cascaded shift register unit IC2 in the first pair P1 includes N cascaded shift registers ($SR_{n+1}$ to $SR_{n+N}$), N internal AND gates ($A_{n+1}$ to $A_{n+N}$), N level shifters ($LS_{n+1}$ to $LS_{n+N}$), N output buffers ($OB_{n+1}$ to $OB_{n+N}$). The second cascaded shift register unit IC2 is electrically connected to the AND gate AND and a protection diode D1.

Referring to FIG. 7, CPV stands for a clock pulse vertical signal, OE1 stands for an output enable signal, Von stands for a gate on voltage, Vg1 stands for a gate off voltage, $SR_{n+1}$ stands for (n+1)th stage shift register, $SR_{n+2}$ stands for (n+2)th stage shift register, $SR_{n+3}$ stands for (n+3)th stage shift register, $SR_{n+N}$ stands for (n+N)th stage shift register, $A_{n+1}$ stands for (n+1)th stage internal AND gate, $A_{n+2}$ stands for (n+2)th stage internal AND gate, $A_{n+3}$ stands for (n+3)th stage internal AND gate, $A_{n+N}$ stands for (n+N)th stage internal AND gate. The first input terminal of each internal AND gate is provided with an inverted signal of OE1 in the same stage, the second input terminal of each internal AND gate is provided with an output signal of a shift register in the same stage. $Gate_{n+1}$ stands for gate scanning signal for the (n+1)th gate line, $Gate_{n+2}$ stands for gate scanning signal for the (n+2)th gate line, $Gate_{n+3}$ stands for gate scanning signal for the (n+3)th gate line, $Gate_{n+N}$ stands for gate scanning signal for the (n+N)th gate line. N is a positive integer, n is a positive integer.

In FIG. 7, $LS_{+1}$ stands for (n+1)th stage level shifter, $LS_{n+2}$ stands for (n+2)th stage level shifter, $LS_{n+3}$ stands for (n+3)th stage level shifter, $LS_{n+N}$ stands for (n+N)th stage level shifter, $OB_{n+1}$ stands for (n+1)th stage output buffer, $OB_{n+2}$ stands for (n+2)th stage output buffer, $OB_{n+3}$ stands for (n+3)th stage output buffer, $OB_{n+N}$ stands for (n+N)th stage output buffer. Each level shifter is provided with a gate on voltage Von and a gate off voltage Vg1.

In FIG. 7, the first input terminal of the AND gate AND is provided with the LYDIO1 signal, the second input terminal of the AND gate AND is provided with the RYDIO1_out signal output by the timer (not shown in FIG.

Figure 8:
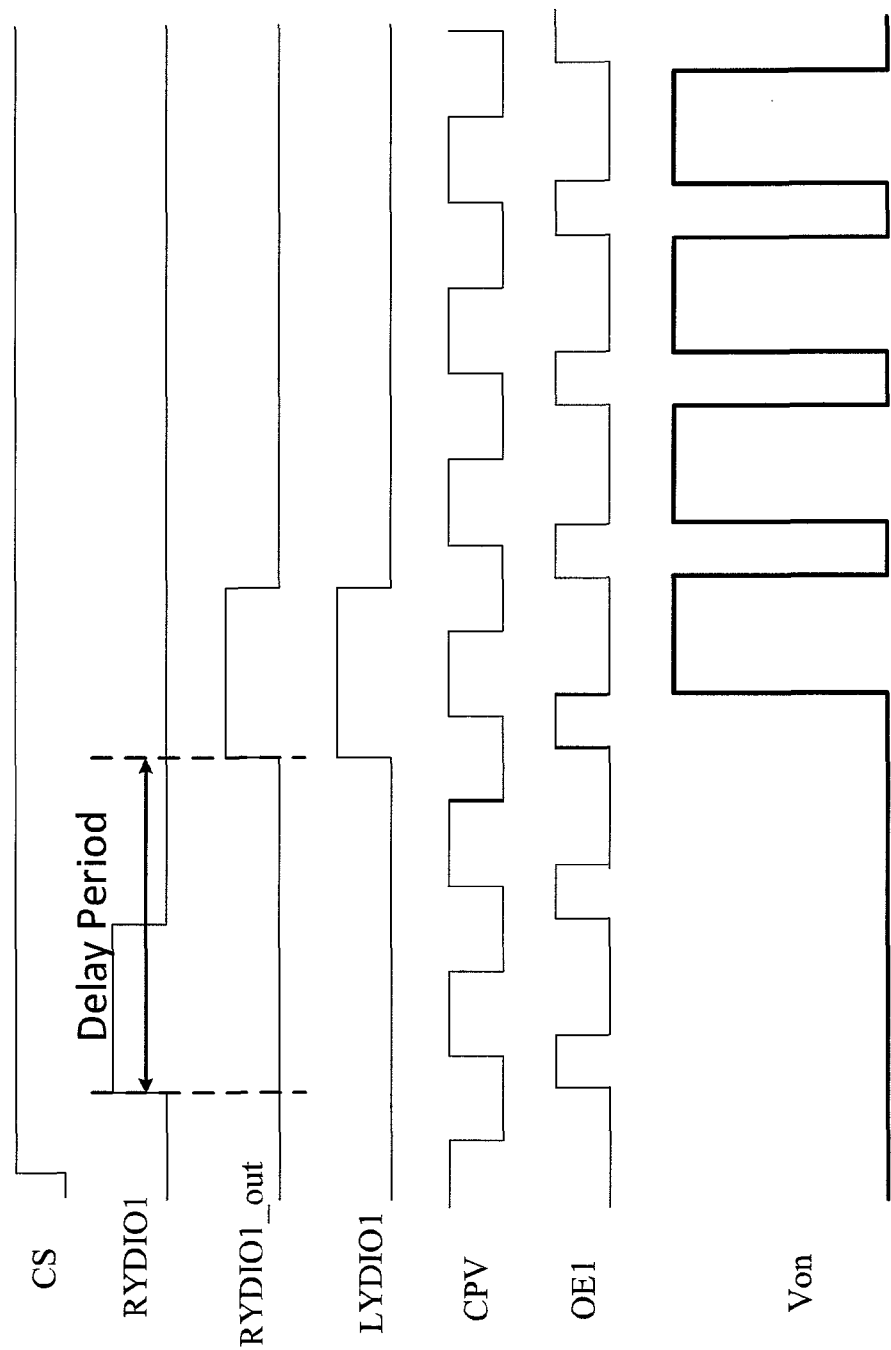
FIG. 8 is a timing diagram illustrating an operation of a second cascaded shift register unit in some embodiments.

7). The level shift register $SR_{n+N}$ in the last stage of the second cascaded shift register unit IC2 (e.g., the second cascaded shift register unit IC2 in the first pair P1 in FIG. 5) outputs LYDIO2_in to a first cascaded shift register unit IC1 (e.g., the first cascaded shift register unit IC1 in the second pair P2). FIG. 8 is a timing diagram illustrating an operation of a second cascaded shift register unit in some embodiments.

In another aspect, the present disclosure provides a method for driving an operation of a gate driving circuit in a display panel. The present driving method controls the first cascaded shift register unit to complete application of gate scanning signals to gate lines connected thereto at a time different from that for the second cascaded shift register unit in a same pair. By having this controlling process, the abrupt difference between $V_{on}$ and $V_{g1}$ when switching gate integrated circuit units may be eliminated, thereby obviating technical problems such as split screen and H-block.

Figure 9:
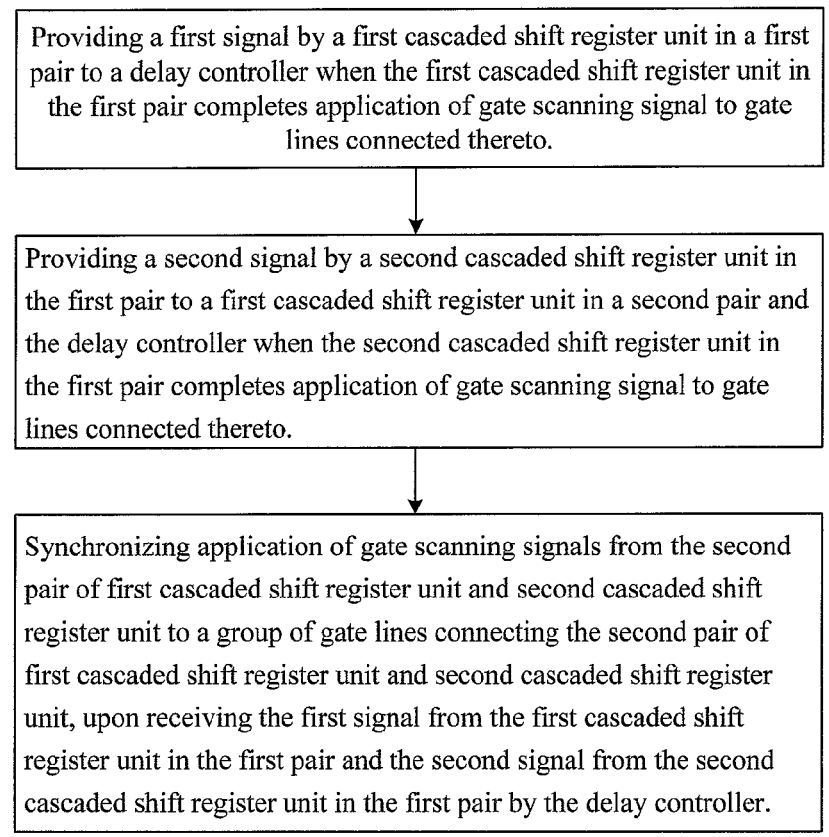
FIG. 9 is a flow chart illustrating a method for driving an operation of a gate driving circuit in some embodiments.

FIG. 9 is a flow chart illustrating a method for driving an operation of a gate driving circuit in some embodiments. Referring to FIG. 9, the method in the embodiment includes providing a first signal by a first cascaded shift register unit in a first pair to a delay controller when the first cascaded shift register unit in the first pair completes application of gate scanning signal to gate lines connected thereto; providing a second signal by a second cascaded shift register unit in the first pair to a first cascaded shift register unit in a second pair and the delay controller when the second cascaded shift register unit in the first pair completes application of gate scanning signal to gate lines connected thereto; and synchronizing application of gate scanning signals from the second pair of first cascaded shift register unit and second cascaded shift register unit to a group of gate lines connecting the second pair of first cascaded shift register unit and second cascaded shift register unit, upon receiving the first signal from the first cascaded shift register unit in the first pair and the second signal from the second cascaded shift register unit in the first pair by the delay controller. Specifically, the gate driving circuit includes a first column of cascaded shift register units and a second column of cascaded shift register units. The first column and the second column have a same number of cascaded shift register units. The first cascaded shift register unit in the first pair is an odd numbered cascaded shift register unit in the first column. The second cascaded shift register unit in the first pair is an odd numbered cascaded shift register unit in the second column. The first cascaded shift register unit in the second pair is an even numbered cascaded shift register unit in the second column. The second cascaded shift register unit in the second pair is an even numbered cascaded shift register unit in the first column.

Optionally, the first column of cascaded shift register units includes a plurality of first cascaded shift register units and second cascaded shift register unit, every odd numbered cascaded shift register unit is a first cascaded shift register unit, and every even numbered cascaded shift register unit is a second cascaded shift register unit. Optionally, the second column of cascaded shift register units includes a plurality of first cascaded shift register units and second cascaded shift register unit, every even numbered cascaded shift register unit is a first cascaded shift register unit, and every odd numbered cascaded shift register unit is a second cascaded shift register unit. Optionally, the display panel includes a plurality first pairs of an odd numbered first cascaded shift register unit in the first column and an odd numbered second cascaded shift register unit in the second column, and a plurality second pairs of an even numbered second cascaded shift register unit in the first column and an even number first cascaded shift register unit in the second column; the first pair and the second pair are alternately arranged.

The present driving method controls the first cascaded shift register unit to complete application of gate scanning signals to gate lines connected thereto at a time different from that for the second cascaded shift register unit in a same pair. By having this controlling process, the abrupt difference between $V_{on}$ and $V_{g1}$ when switching gate integrated circuit units may be eliminated, thereby obviating technical problems such as split screen and H-block. The present driving method synchronizes application of gate scanning signals by the first cascaded shift register unit and second cascaded shift register unit in a same pair to the group of gate lines connecting the same pair, based on the first signal and the second signal generated in a previous pair. By having an interactive signal control mechanism, it obviates technical problems associated with out-of-phase gate voltages caused by unsynchronized switching of gate integrated circuit units.

In some embodiments, the step of synchronizing application of gate scanning signals from the second pair of first cascaded shift register unit and second cascaded shift register unit to a group of gate lines connecting the second pair of first cascaded shift register unit and second cascaded shift register unit includes generating the delay clock signal by the timing controller; generating the delay control signal based on the delay clock signal and the second signal by the timing counter; and outputting the control signal by the AND gate to turn on the second cascaded shift register unit in the second pair for applying gate scanning signal to gate lines connected thereto when the first signal and the delay control signal are both valid.

In some embodiments, the driving method further includes generating the input-output selection signal by the timing controller.

In some embodiments, the step of generating the delay clock signal includes controlling the electrical connection between the input node and the second cascaded shift register unit in the first pair by the input-output selector based on the input-output selection signal; controlling the electrical connection between the output node and the second input terminal of the AND gate by the input-output selector based on the input-output selection signal; determining a delay period by the timer based on the delay clock signal; delaying the second signal input from the input node of the timer by the delay period; and outputting the delay control signal to the output node.

In some embodiments, the timing controller generates the input-output selection signal and the delay clock signal, the timer determines the delay period based on the delay clock signal, and the input-output selector controls the electrical connection between the input node and the second cascaded shift register unit in the first pair and the electrical connection between the output node and the second input terminal of the AND gate.

In another aspect, the present disclosure provides a novel gate driving circuit having a plurality pairs of cascaded shift register units for driving a plurality of gate lines connecting the plurality pairs of cascaded shift register units. In some embodiments, two cascaded shift register units in each pair of cascaded shift register units have different stages of cascaded shift registers. For example, the gate driving circuit may have a controller for controlling application of gate scanning signals to the plurality of gate lines. The gate driving circuit has N cascaded shift register units electrically coupled to the controller on a first side, and N cascaded shift register units electrically coupled to the controller on a second side. Each cascaded shift register unit on the first side pairs with a cascaded shift register unit on the second side, forming a pair of cascaded shift register units, e.g., in a one-to-one relationship. The cascaded shift register units on the first side are electrically coupled in series, the cascaded shift register units on the second side are electrically coupled in series. Optionally, each cascaded shift register unit includes a number of stages of cascaded shift registers for connecting with a same number of gate lines.

In some embodiments, the cascaded shift register units on the first side include a plurality of alternatedly arranged first cascaded shift register units and second cascaded shift register units, the cascaded shift register units on the second side include a plurality of alternatedly arranged first cascaded shift register units and second cascaded shift register units, each pair of cascaded shift register units includes a first cascaded shift register unit on the first side and a second cascaded shift register unit on the second side. The first cascaded shift register unit and the second cascaded shift register unit have different stages of cascaded shift registers. As such, the first cascaded shift register unit in each pair is adjacent to and electrically coupled to the second cascaded shift register unit in each adjacent pair on a same side, the second cascaded shift register unit in each pair is adjacent to and electrically coupled to the first cascaded shift register unit in each adjacent pair on a same side.

In some embodiments, the controller in the gate driving circuit includes a delay controller connected to a first cascaded shift register unit and a second cascaded shift register unit in a first pair, respectively. The first cascaded shift register unit in the first pair is configured to provide a first signal to the delay controller when the first cascaded shift register unit completes application of gate scanning signal to gate lines connected thereto, and the second cascaded shift register unit in the first pair is configured to provide a second signal to the first cascaded shift register unit in a second pair and the delay controller when the second cascaded shift register unit in the first pair completes application of gate scanning signal to gate lines connected thereto, the second pair being adjacent to the first pair. Upon receiving the first signal from the first cascaded shift register unit in the first pair and the second signal from the second cascaded shift register unit in the first pair, the delay controller is configured to synchronize application of gate scanning signals by the second pair of first cascaded shift register unit and second cascaded shift register unit to a group of gate lines connecting the second pair of first cascaded shift register unit and second cascaded shift register unit.

In some embodiments, the delay controller includes an AND gate, a timing controller for generating a delay clock signal, and a timing counter for generating a delay control signal based on the delay clock signal and the second signal. The first input terminal of the AND gate is configured to receive the first signal, the second input terminal of the AND gate is configured to receive the delay control signal, and the output terminal of the AND gate is connected to the second cascaded shift register unit in the second pair. When the first signal and the delay control signal are both valid, the AND gate outputs a control signal to turn on the second cascaded shift register unit in the second pair for applying gate scanning signal to gate lines connected thereto.

In some embodiments, the timing counter includes a timer and an input-output selector. The timing controller is configured to generate an input-output selection signal. The timer includes an input node and an output node. Upon receiving the delay clock signal, the timer determines a delay period based on the delay clock signal, delays the second signal input from the input node by the delay period, and outputs the delay control signal to the output node. Upon receiving the input-output selection signal, the input-output selector controls an electrical connection between the input node and the second cascaded shift register unit in the first pair for inputting the second signal, and controls an electrical connection between the output node and the second input terminal of the AND gate for outputting the delay control signal.

In some embodiments, the gate driving circuit further includes a protection diode having an anode connected to the second cascaded shift register unit in the first pair for receiving the second signal and a cathode connected to the input node of the timer.

In some embodiments, the first cascaded shift register unit of the first pair and the second cascaded shift register unit of the second pair are on the first side; and the second cascaded shift register unit of the first pair and the first cascaded shift register unit of the second pair are on the second side.

In some embodiments, the first cascaded shift register unit in the first pair is configured to receive a first start vertical signal from the timing controller; and the second cascaded shift register unit in the first pair is configured to receive a second start vertical signal from the timing controller.

In some embodiments, the first cascaded shift register unit receiving the first start vertical signal is a first cascaded shift register unit on the first side, and the second cascaded shift register unit receiving the second start vertical signal is a first cascaded shift register unit on the second side.

In some embodiments, when the input-output selection signal is a first voltage signal, the input node of the timer is connected to the second cascaded shift register unit of the first pair on the second side, and the output node of the timer is connected to the second cascaded shift register unit of the second pair on the first side. When the input-output selection signal is a second voltage signal, the input node of the timer is connected to the second cascaded shift register unit of the second pair on the first side, and the output node of the timer is connected to the second cascaded shift register unit of the first pair on the second side.

In some embodiments, the delay clock signal determines a number of delay steps in the delay period provided by the timer. The second cascaded shift register unit in the first pair completes application of gate scanning signal to gate lines connected thereto earlier than the first cascaded shift register unit in the first pair completes application of gate scanning signal to gate lines connected thereto by N clock pulse vertical signals. The number of delay steps is determined to be N.

In some embodiments, the gate driving circuit includes a plurality of first pairs and a plurality of second pairs alternately arranged on the display panel, the first cascaded shift register unit in each of the plurality of first pairs is electrically coupled to the second cascaded shift register unit in each adjacent second pair; and the second cascaded shift register unit in each of the plurality of first pairs is electrically coupled to the first cascaded shift register unit in each adjacent second pair.

In another aspect, the present disclosure provides a display apparatus having a display panel described herein. Examples of appropriate display apparatuses include, but are not limited to, a liquid crystal display panel, an electronic paper, an organic light emitting display panel, a mobile phone, a tablet computer, a television, a monitor, a notebook computer, a digital album, a GPS, etc.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display panel having a plurality of gate lines and a gate driving circuit for driving the plurality of gate lines, the gate driving circuit including a plurality of first cascaded shift register units and a plurality of second cascaded shift register units for applying gate scanning signals to gate lines connected thereto; the display panel comprising:
    a first pair of first cascaded shift register unit and second cascaded shift register unit;
    a second pair of first cascaded shift register unit and second cascaded shift register unit; the second pair adjacent to the first pair; the first cascaded shift register unit in the first pair is electrically coupled to the second cascaded shift register unit in the second pair; and the second cascaded shift register unit in the first pair is electrically coupled to the first cascaded shift register unit in the second pair;
    a first group of gate lines connecting the first pair of first cascaded shift register unit and second cascaded shift register unit; and
    a second group of gate lines connecting the first cascaded shift register unit in the first pair and the first cascaded shift register unit in the second pair;
    wherein the gate driving circuit comprises a first column of cascaded shift register units and a second column of cascaded shift register units, the first column and the second column having a same number of cascaded shift register units; the first cascaded shift register unit in the first pair is an odd numbered cascaded shift register unit in the first column, the second cascaded shift register unit in the first pair is an odd numbered cascaded shift register unit in the second column, the first cascaded shift register unit in the second pair is an even numbered cascaded shift register unit in the second column, and the second cascaded shift register unit in the second pair is an even numbered cascaded shift register unit in the first column.

2. The display panel of claim 1, further comprising a third group of gate lines connecting the second pair of first cascaded shift register unit and second cascaded shift register unit.

3. The display panel of claim 2, wherein the first group of gate lines and the third group of gate lines have a same number of gate lines.

4. The display panel of claim 2, wherein the display panel further comprising a delay controller connected to the first cascaded shift register unit and the second cascaded shift register unit in the first pair, respectively;
    the first cascaded shift register unit in the first pair is configured to provide a first signal to the delay controller when the first cascaded shift register unit in the first pair completes application of gate scanning signal to gate lines connected thereto;
    the second cascaded shift register unit in the first pair is configured to provide a second signal to the first cascaded shift register unit in the second pair and the delay controller when the second cascaded shift register unit in the first pair completes application of gate scanning signal to gate lines connected thereto; and
    upon receiving the first signal from the first cascaded shift register unit in the first pair and the second signal from the second cascaded shift register unit in the first pair, the delay controller is configured to synchronize application of gate scanning signals by the second pair of first cascaded shift register unit and second cascaded shift register unit to the third group of gate lines.

5. The display panel of claim 4, wherein the delay controller further comprises an AND gate, a timing controller for generating a delay clock signal, and a timing counter for generating a delay control signal based on the delay clock signal and the second signal;
    a first input terminal of the AND gate is configured to receive the first signal, a second input terminal of the AND gate is configured to receive the delay control signal, and an output terminal of the AND gate is connected to the second cascaded shift register unit in the second pair; and
    when the first signal and the delay control signal are both valid, the AND gate outputs a control signal to turn on the second cascaded shift register unit in the second pair for applying gate scanning signal to gate lines connected thereto.

6. The display panel of claim 5, wherein the timing counter comprises a timer and an input-output selector;
    the timing controller is configured to generate an input-output selection signal;
    the timer comprises an input node and an output node;
    upon receiving the delay clock signal, the timer determines a delay period based on the delay clock signal, delays a second signal input from the input node by the delay period, and outputs the delay control signal to the output node; and
    upon receiving the input-output selection signal, the input-output selector controls an electrical connection between the input node and the second cascaded shift register unit in the first pair for inputting the second signal, and controls an electrical connection between the output node and the second input terminal of the AND gate for outputting the delay control signal.

7. The display panel of claim 6, wherein the gate driving circuit further comprises a protection diode having an anode connected to the second cascaded shift register unit in the first pair for receiving the second signal and a cathode connected to the input node of the timer.

8. The display panel of claim 1, wherein the first cascaded shift register unit of the first pair and the second cascaded shift register unit of the second pair are on a first side of the display panel; and the second cascaded shift register unit of the first pair and the first cascaded shift register unit of the second pair are on a second side of the display panel.

9. The display panel of claim 5, wherein the first cascaded shift register unit of the first pair and the second cascaded shift register unit of the second pair are on a first side of the display panel; and the second cascaded shift register unit of the first pair and the first cascaded shift register unit of the second pair are on a second side of the display panel;
the display panel comprises a plurality of first pairs and a plurality of second pairs alternately arranged on the display panel; the first side having a plurality of first cascaded shift register units and a plurality of second cascaded shift register units alternately arranged; and the second side having a plurality of second cascaded shift register units and a plurality of first cascaded shift register units alternatedly arranged; and
the first cascaded shift register unit in the first pair is configured to receive a first start vertical signal from the timing controller; and the second cascaded shift register unit in the first pair is configured to receive a second start vertical signal from the timing controller.

10. The display panel of claim 9, wherein the first cascaded shift register unit receiving the first start vertical signal is a first cascaded shift register unit on the first side, and the second cascaded shift register unit receiving the second start vertical signal is a first cascaded shift register unit on the second side.

11. The display panel of claim 6, wherein the first cascaded shift register unit of the first pair and the second cascaded shift register unit of the second pair are on a first side of the display panel; and the second cascaded shift register unit of the first pair and the first cascaded shift register unit of the second pair are on a second side of the display panel;
when the input-output selection signal is a first voltage signal, the input node of the timer is connected to the second cascaded shift register unit of the first pair on the second side, and the output node of the timer is connected to the second cascaded shift register unit of the second pair on the first side; and
when the input-output selection signal is a second voltage signal, the input node of the timer is connected to the second cascaded shift register unit of the second pair on the first side, and the output node of the timer is connected to the second cascaded shift register unit of the first pair on the second side.

12. The display panel of claim 6, wherein the first cascaded shift register unit of the first pair and the second cascaded shift register unit of the second pair are on a first side of the display panel; and the second cascaded shift register unit of the first pair and the first cascaded shift register unit of the second pair are on a second side of the display panel;
the delay clock signal determines a number of delay steps in the delay period provided by the timer;

the second cascaded shift register unit in the first pair completes application of gate scanning signal to gate lines connected thereto earlier than the first cascaded shift register unit in the first pair completes application of gate scanning signal to gate lines connected thereto by N clock pulse vertical signals; and
the number of delay steps is determined to be N.

13. The display panel of claim 1, comprising:
a plurality of first pairs and a plurality of second pairs alternately arranged on the display panel;
the first cascaded shift register unit in each of the plurality of first pairs is electrically coupled to the second cascaded shift register unit in each adjacent second pair; and the second cascaded shift register unit in each of the plurality of first pairs is electrically coupled to the first cascaded shift register unit in each adjacent second pair;
a first group of gate lines connecting each of the plurality of first pairs and connecting each of the plurality of second pairs, respectively; and
a second group of gate lines connecting the first cascaded shift register unit in each of the plurality of first pairs and the first cascaded shift register unit in each adjacent second pair.

14. A method for driving an operation of a gate driving circuit in a display panel of claim 6, comprising:
providing gate scanning signals by the first cascaded shift register unit in the first pair to gate lines connected thereto; and
providing gate scanning signals by the second cascaded shift register unit in the first pair to gate lines connected thereto;
wherein the second cascaded shift register unit in the first pair completes application of gate scanning signal to gate lines connected thereto earlier than the first cascaded shift register unit in the first pair completes application of gate scanning signal to gate lines connected thereto by N clock pulse vertical signals.

15. The method of claim 14, further comprising:
providing the first signal by the first cascaded shift register unit in the first pair to the delay controller when the first cascaded shift register unit in the first pair completes application of gate scanning signal to gate lines connected thereto;
providing the second signal by the second cascaded shift register unit in the first pair to the first cascaded shift register unit in the second pair and the delay controller when the second cascaded shift register unit in the first pair completes application of gate scanning signal to gate lines connected thereto; and
synchronizing application of gate scanning signals from the second pair of first cascaded shift register unit and second cascaded shift register unit to the third group of gate lines by the delay controller, upon receiving the first signal from the first cascaded shift register unit in the first pair and the second signal from the second cascaded shift register unit in the first pair by the delay controller.

16. The method of claim 15, wherein the step of synchronizing comprises:
generating the delay clock signal by the timing controller;
generating the delay control signal based on the delay clock signal and the second signal by the timing counter; and
outputting the control signal by the AND gate to turn on the second cascaded shift register unit in the second pair for applying gate scanning signal to gate lines connected thereto when the first signal and the delay control signal are both valid.

17. The method of claim 16, further comprising generating an input-output selection signal by the timing controller;

wherein the step of generating the delay clock signal comprises:

controlling the electrical connection between the input node and the second cascaded shift register unit in the first pair by the input-output selector based on the input-output selection signal;

controlling the electrical connection between the output node and the second input terminal of the AND gate by the input-output selector based on the input-output selection signal;

determining a delay period by the timer based on the delay clock signal;

delaying a second signal input from the input node of the timer by the delay period; and outputting the delay control signal to the output node.

18. A display apparatus, comprising a display panel of claim 1.

19. A gate driving circuit, comprising a first column of cascaded shift register units and a second column of cascaded shift register units, thereby forming a plurality pairs of cascaded shift register units for driving a plurality of gate lines, each pair of cascaded shift register units being in a same row of cascaded shift register units; and two cascaded shift register units in each pair of cascaded shift register units have different total numbers of stages of cascaded shift registers;

wherein each pair of cascaded shift register units comprises a first cascaded shift register unit and a second cascaded shift register unit; the first cascaded shift register unit and the second cascaded shift register unit having different total numbers of stages of cascaded shift registers;

the first cascaded shift register unit in each individual pair is adjacent to and electrically coupled to the second cascaded shift register unit in a respective adjacent pair; and the second cascaded shift register unit in each individual pair is adjacent to and electrically coupled to the first cascaded shift register unit in the respective adjacent pair.

* * * * *